US008015058B2

(12) United States Patent
Fowler et al.

(10) Patent No.: US 8,015,058 B2
(45) Date of Patent: *Sep. 6, 2011

(54) USER-MAINTAINED CONTACT INFORMATION DATA SYSTEM

(75) Inventors: James F. Fowler, San Mateo, CA (US); Garth B. Moulton, San Carlos, CA (US); Peng Chong Sien, San Francisco, CA (US); Saaed Fattahi, Brighton, MI (US); Rajan Madhavan, Foster City, CA (US); Kenneth R. Lenga, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 1504 days.

This patent is subject to a terminal disclaimer.

(21) Appl. No.: 11/203,012

(22) Filed: Aug. 12, 2005

(65) Prior Publication Data
US 2006/0116896 A1    Jun. 1, 2006

Related U.S. Application Data

(60) Provisional application No. 60/601,343, filed on Aug. 12, 2004.

(51) Int. Cl.
*G06Q 30/00* (2006.01)
(52) U.S. Cl. .................................................. 705/14.11
(58) Field of Classification Search ...................... 705/14
See application file for complete search history.

(56) References Cited

U.S. PATENT DOCUMENTS

| 5,864,871 | A | | 1/1999 | Kitain et al. |
| 6,061,660 | A | | 5/2000 | Eggleston et al. |
| 6,073,138 | A | * | 6/2000 | de l'Etraz et al. ......... 707/104.1 |
| 6,236,955 | B1 | | 5/2001 | Summers |
| 6,311,191 | B1 | | 10/2001 | Retallick |
| 6,408,263 | B1 | | 6/2002 | Summers |
| 6,529,724 | B1 | | 3/2003 | Khazaka et al. |
| 6,546,005 | B1 | | 4/2003 | Berkley et al. |

(Continued)

FOREIGN PATENT DOCUMENTS

EP    1503604    2/2005

(Continued)

OTHER PUBLICATIONS

Search Report for International Application No. PCT US05 28788 Mar. 8, 2006.

(Continued)

*Primary Examiner* — Namrata Boveja
*Assistant Examiner* — M Hamilton
(74) *Attorney, Agent, or Firm* — Kilpatrick Townsend & Stockton LLP

(57) ABSTRACT

There is provided a method and system to maintain published contact information. The system includes a storage facility to store contact information of a first entity at the system. The system further includes an interface to electronically publish, via a communications network, the contact information of the first entity to a plurality of users of the system and receive, at the system, information relating to validity of the contact information of the first entity. The information is received via the communications network from a first user of the plurality of users. The system further includes a stored value module automatically to provide a reward to the first user responsive to the receipt of the information relating to the validity of the contact information of the first entity.

25 Claims, 20 Drawing Sheets

U.S. PATENT DOCUMENTS

| | | | |
|---|---|---|---|
| 6,556,976 | B1 | 4/2003 | Callen |
| 6,654,768 | B2 | 11/2003 | Celik |
| 6,694,353 | B2 | 2/2004 | Sommerer |
| 6,807,423 | B1 | 10/2004 | Armstrong et al. |
| 6,807,532 | B1 | 10/2004 | Kolls |
| 6,820,083 | B1 | 11/2004 | Nagy |
| 6,839,680 | B1 | 1/2005 | Liu et al. |
| 6,845,448 | B1 | 1/2005 | Chaganti et al. |
| 6,883,000 | B1 | 4/2005 | Gropper |
| 6,886,101 | B2 | 4/2005 | Glazer et al. |
| 6,889,213 | B1 | 5/2005 | Douvikas et al. |
| 7,240,022 | B1 * | 7/2007 | Bistriceanu et al. ........ 705/14.19 |
| 7,636,719 | B2 * | 12/2009 | Thompson et al. .................... 1/1 |
| 2001/0032089 | A1 * | 10/2001 | Schiller ............... 705/1 |
| 2002/0019817 | A1 | 2/2002 | Matsui et al. |
| 2002/0042733 | A1 | 4/2002 | Lesandrini et al. |
| 2002/0046041 | A1 * | 4/2002 | Lang ................. 705/1 |
| 2002/0152265 | A1 | 10/2002 | Felman |
| 2002/0174188 | A1 | 11/2002 | Clark et al. |
| 2002/0194056 | A1 | 12/2002 | Summers |
| 2003/0023514 | A1 | 1/2003 | Adler et al. |
| 2003/0033179 | A1 | 2/2003 | Katz et al. |
| 2003/0036944 | A1 | 2/2003 | Lesandrini et al. |
| 2003/0061092 | A1 | 3/2003 | Dutta et al. |
| 2003/0065642 | A1 | 4/2003 | Zee |
| 2003/0172014 | A1 | 9/2003 | Quackenbush et al. |
| 2004/0002892 | A1 | 1/2004 | Gluck et al. |
| 2004/0019579 | A1 | 1/2004 | Herz et al. |
| 2004/0030616 | A1 | 2/2004 | Florance et al. |
| 2004/0093317 | A1 | 5/2004 | Swan |
| 2004/0111959 | A1 | 6/2004 | Detchou |
| 2004/0122735 | A1 | 6/2004 | Meshkin |
| 2004/0215517 | A1 | 10/2004 | Chen et al. |
| 2004/0225525 | A1 | 11/2004 | Weitzman |
| 2004/0225650 | A1 | 11/2004 | Cooper et al. |
| 2004/0230484 | A1 | 11/2004 | Greenlee |
| 2005/0065950 | A1 | 3/2005 | Chaganti et al. |
| 2005/0102257 | A1 | 5/2005 | Onyon et al. |
| 2005/0108344 | A1 | 5/2005 | Tafoya et al. |
| 2005/0114456 | A1 | 5/2005 | Mathew et al. |
| 2005/0114462 | A1 | 5/2005 | Mathew et al. |
| 2005/0120084 | A1 | 6/2005 | Hu et al. |
| 2005/0144082 | A1 | 6/2005 | Coolman |
| 2005/0149487 | A1 | 7/2005 | Celik |
| 2006/0010033 | A1 | 1/2006 | Thomas |
| 2006/0064436 | A1 | 3/2006 | Fowler et al. |
| 2006/0111975 | A1 | 5/2006 | Fowler et al. |
| 2006/0155750 | A1 | 7/2006 | Fowler et al. |

FOREIGN PATENT DOCUMENTS

| | | |
|---|---|---|
| JP | 02092450 | 3/2002 |
| WO | WO-0005670 A1 | 2/2000 |
| WO | WO-0120497 A2 | 3/2001 |
| WO | WO-0193559 A1 | 12/2001 |
| WO | WO-0233616 A1 | 4/2002 |
| WO | WO-02082319 A1 | 10/2002 |
| WO | WO-03056464 A1 | 7/2003 |
| WO | WO-2004008276 A2 | 1/2004 |
| WO | WO-2004114159 A1 | 12/2004 |
| WO | WO-2005001656 A2 | 1/2005 |
| WO | WO2006020893 | 2/2006 |

OTHER PUBLICATIONS

"U.S. Appl. No. 11/203,061, Non-Final Office Action mailed Mar. 2, 2009", 11 pgs.

"U.S. Appl. No. 11/203,061, Non-Final office Action mailed Sep. 18, 2008", 10 pgs.

"U.S. Appl. No. 11/203,061, Response filed Dec. 18, 2008 to Non-Final office Action mailed Sep. 18, 2008", 15 pgs.

"U.S. Appl. No. 11/203,061, Response filed Jun. 2, 2009 to Non Final Office Action mailed Mar. 2, 2009", 12 pgs.

"International Application Serial No. PCT/US05/28788, International Preliminary Report on Patentability mailed Aug. 14, 2006", 4 pgs.

"International Application Serial No. PCT/US05/28788, International Search Report and Written Opinion mailed Mar. 8, 2006", 10 pgs.

Anastasia, George, "Informant received $250,000 reward Mobster Ron Previte got the money from the federal government after he testified at a series of mob trials", *Philadelphia Inquirer*, (Aug. 14, 2003). P.A p. B.1; 3 pgs.

"U.S. Appl. No. 11/203,037, Non-Final Office Action mailed Jul. 17, 2009", 17 pgs.

"U.S. Appl. No. 11/203,049, Preliminary Amendment filed Jun. 10, 2009", 6 pgs.

"U.S. Appl. No. 11/203,061, Final Office Action mailed Sep. 10, 2009", 15 pgs.

"European Application serial No. 05789060.0, Office action mailed Aug. 14, 2009", 1 pg.

Hui, Kai-Lung, "Privacy, Information Presentation, and Question Sequence", Available at http://www.comp.nus.edu.sq/~lung/sequence.pdf, (Jul. 2004), pp. 1-29.

"U.S. Appl. No. 11/203,037, Examiner Interview Summary mailed Mar. 17, 2010", 4 pgs.

"U.S. Appl. No. 11/203,037, Non-Final Office Action mailed Jan. 21, 2010", 24 pgs.

"U.S. Appl. No. 11/203,037, Response filed Nov. 10, 2009 to Non Final Office Action mailed Jul. 17, 2009", 22 pgs.

"U.S. Appl. No. 11/203,049, Non-Final Office Action mailed Feb. 22, 2010", 15 pgs.

"U.S. Appl. No. 11/203,061, Examiner Interview Summary mailed Mar. 17, 2010", 4 pgs.

"U.S. Appl. No. 11/203,061, Non-Final Office Action mailed Dec. 28, 2009", 19 pgs.

"U.S. Appl. No. 11/203,061, Response filed Nov. 10, 2009 to Final Office Action mailed Sep. 10, 2009", 16 pgs.

"Australian Application Serial No. 2005272655, First Examiner Report mailed Apr. 1, 2010", 2 pgs.

"Achieving Customer Service Excellence: The Vital Role of Content Integration", an Industry white paper, Available at http://dmreview.com/whitepaper/WID1008847.pdf, 17 pgs, 2004.

"Electronic Banking", Available at http://www.pueblo.gsa.gov/cic_text/money/e-banking/bank.htm, 6 pgs, 2003.

"Electronic Money, or E-Money, and Digital Cash", Available at http://www.ex.ac.uk/~RDavies/arian/emoney.htm, 12 pgs, 2005.

"Kiosk Applications and ROI", Available at http://www.kiosks.org/pdfs/netkey-roi.pdf, Netkey, Inc.,(Dec. 2001), 40 pgs.

Division of Computer Science, UC Berkeley, "Toward a Model of Self-administering Data", Available at http://www.cs.berkeley.edu/~hoon/published/jcdl2001.pdf, 9 pgs, 2001.

"Welcome to the Electronic Information Marketplace", Communication Studies at York, Available at the Electronic Information Marketplace at http://communicationstudies.ca/courses/4320/node?from=19 pgs, 2005.

Cho, Yooncheong, et al., "An Analysis of Online Customer Complaints: Implications for Web Complaint Management", Available at http://www.hicss.hawaii.edu/HICSS_35/HICSSpapers/PDFdocuments/INCRM06.pdf, 10 pgs, 2002.

Choi, Soon-Yong, et al., "The Economics of Electronic Commerce—Essential Economics for Doing Business in the Electronic Marketplace", Available at: crec.mccombs.utexas.edu/works/eecflyer.html, 4 pgs, 1997.

Coe, John M., "The integration of direct marketing and field sales to form a new B2B sales coverage model", Journal of Interactive Marketing, 18(2), Available at http://www3.interscience.wiley.com/search/allsearch?mode=quicksearch&WISindexid1=WISall&WIS-search1=108067094,(2004), 62-74, 2004.

Hui, Kai-Lung, "Privacy, Information Presentation, and Question Sequence", http://www.comp.nus.edu.sg/~lung/sequence.pdf, (Jul. 2004), 1-29.

Miliou, Chrysovalantou, "Business-to-business electronic marketplaces: Joining a public or creating a private (Universidad Carlos III de Madrid, Spain)", Available at http://www.interscience.wiley.com/jpages/1076-9307, 14 pgs, 2004.

Semper, "Secure Electronic Marketplace for Europe", Available at http://www.semper.org, ACTS Project AC026, 3 pgs, 2005.

Solic, Kresimir, "Customer Relationship Management", Available at http://www.officium.hr/kresimir/docs/CaseStudy.pdf, (Autumn/Winter 2001/2002), 65 pgs.

Tang, Xiangyu, et al., "CSE—Enhanced Contact Management System ECMS; Operational Concept Description (OCD)", http://www-Available at scf.usc.edu/~csci577/section3/www/team34a/LCA/OCD_LCA_F03a_T34.pdf, 87 pgs, 2003.

* cited by examiner

FIGURE 27

USER-MAINTAINED CONTACT INFORMATION DATA SYSTEM

RELATED APPLICATIONS

The present application claims the priority benefit of U.S. Provisional Application Ser. No. 60/601,343, filed Aug. 12, 2004, and entitled "METHOD AND SYSTEM TO PROCESS BUSINESS CONTACT INFORMATION", the contents of which is incorporated in its entirety herein.

TECHNICAL FIELD

This application relates to a method and system to maintain a data management and publication system and, in one example embodiment, a system to collect and maintain information regarding an entity (e.g., contact information regarding a corporate entity).

BACKGROUND

Information regarding corporate entities, and individuals employed by those corporate entities, is highly valuable information for potential and actual suppliers, customers and competitors of a corporate entity. Specifically, the sales department of a seller corporation is usually interested in locating individuals at a potential customer corporation who can be contacted to discuss a possible relationship between the seller corporation and the customer corporation. Further, information regarding individuals within a particular corporate entity may be very useful to corporate recruiters.

To meet the demand for business information (e.g., individual and corporate contact information), a number of companies offer such information services. For example, the Hoover's Inc, a Dun and Bradstreet Company, has provided information on US companies and industries since 1990, originally only in print form, but since '93 via its website, Hoover's Online. The Dun and Bradstreet Corporation is a leading provider of business information, and its major divisions are Risk Management Solutions, Sales and Marketing Solutions, Supply Management Solutions, and e-Business Solutions. In order to gather and keep current a collection of business information that rapidly changes, business information companies are required to employ a large number of researchers and analysts, and also to employ sophisticated data gathering technologies.

Social networking services have also emerged as a valuable avenue for users to locate jobs, people and business opportunities. Such social network services typically deploy specialized software to focus on building and verifying social networks for a number of purposes, including business purposes. LinkedIn.com is an example of such an Internet-based social network service, and enables users to locate other users who may be useful to them for business purposes, and that may be connected (by varying degrees) to the seeking users' social network. Such social network services may encourage a user to upload their address book to the social network service. Software deployed by the social network service then matches the entries within the uploaded address book to entries within its database in order to establish connections.

In addition to contact information relating to corporate entities, other business and corporate information may be extremely valuable to external entities. Examples of such information include head count, revenue and organizational structure information. Such information may or may not be published by a particular corporate entity. For example, where the corporate entity is a private entity, such information may be hard to obtain. Accordingly, it is a challenge to the business information companies to gather and publish such information to their customers.

It will also be appreciated that there are a number of technical challenges and difficulties in maintaining a large body of business information. This information, as noted above, is continually evolving. Accordingly, the information gathering systems employed by business information companies typically are required to provide researchers and analysts with access to a large number of sources from which current business information can be a gleaned. The provision of such access, and the management of the resulting data traffic and storage requirements, presents a number of technical challenges.

SUMMARY OF THE INVENTION

According to an example aspect of the invention, there is provided a system to maintain published contact information. The system includes a storage facility to store contact information of a first entity. The system further includes an interface to electronically publish, via communications network, the contact information of the first entity to a plurality of users of the system. The interface is further to receive information relating to validity of the contact information of the first entity, the information being received via the communications network from a first user of a plurality of users. The system further includes a stored value module automatically to provide a reward to the first user responsive to the receipt of the information relating to the validity of the contact information of the first entity.

Other features of the present invention will be apparent from the accompanying drawings and from the detailed description that follows.

BRIEF DESCRIPTION OF DRAWINGS

The present invention is illustrated byway of example and not limitation in the figures of the accompanying drawings, in which like references indicate similar elements and in which:

FIGS. 9-17 are representations of user interfaces, according to one embodiment.

FIG. 27 is a representation of a user interface, according to one embodiment.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

An exemplary embodiment provides a business contact platform that includes a network of users, client terminals, network apparatus, host servers, middleware, applications, database objects, data, administration interfaces and user interfaces. The business contact platform may operate to provide a value (e.g., a reward in the form of award points) to a user that provides business contact information (e.g., corporate information, contact information etc.) to the platform and/or that maintains (e.g., updates, challenges confirms etc.) business contact information accessible via the business contact platform. The business contact platform may furthermore allow a user to exchange the awarded value (e.g., to redeem the award points) for access to business contact information that had been added and/or maintained by other users. Accordingly, in one embodiment, the business contact platform may be viewed as an open, collaborative and self-correcting information exchange system.

Specifically, the business contact platform may maintain a database of contact information that is considered "open" because users may enter, confirm, update and/or challenge information stored in this database. This database may furthermore be made accessible (e.g., displayed) in real time by the business contact platform.

The business contact platform may also be considered collaborative, as users vote, maintain and sustain the database through collective action on the data. Further, the business contact platform may be considered "self-correcting", because users may validate, update, correct and/or delete information through collective action on the data. In one embodiment, the business contact platform may also be considered an exchange, because users exchange information they have for information that they need, either directly or through a stored value (e.g., points) system.

Figure 1:
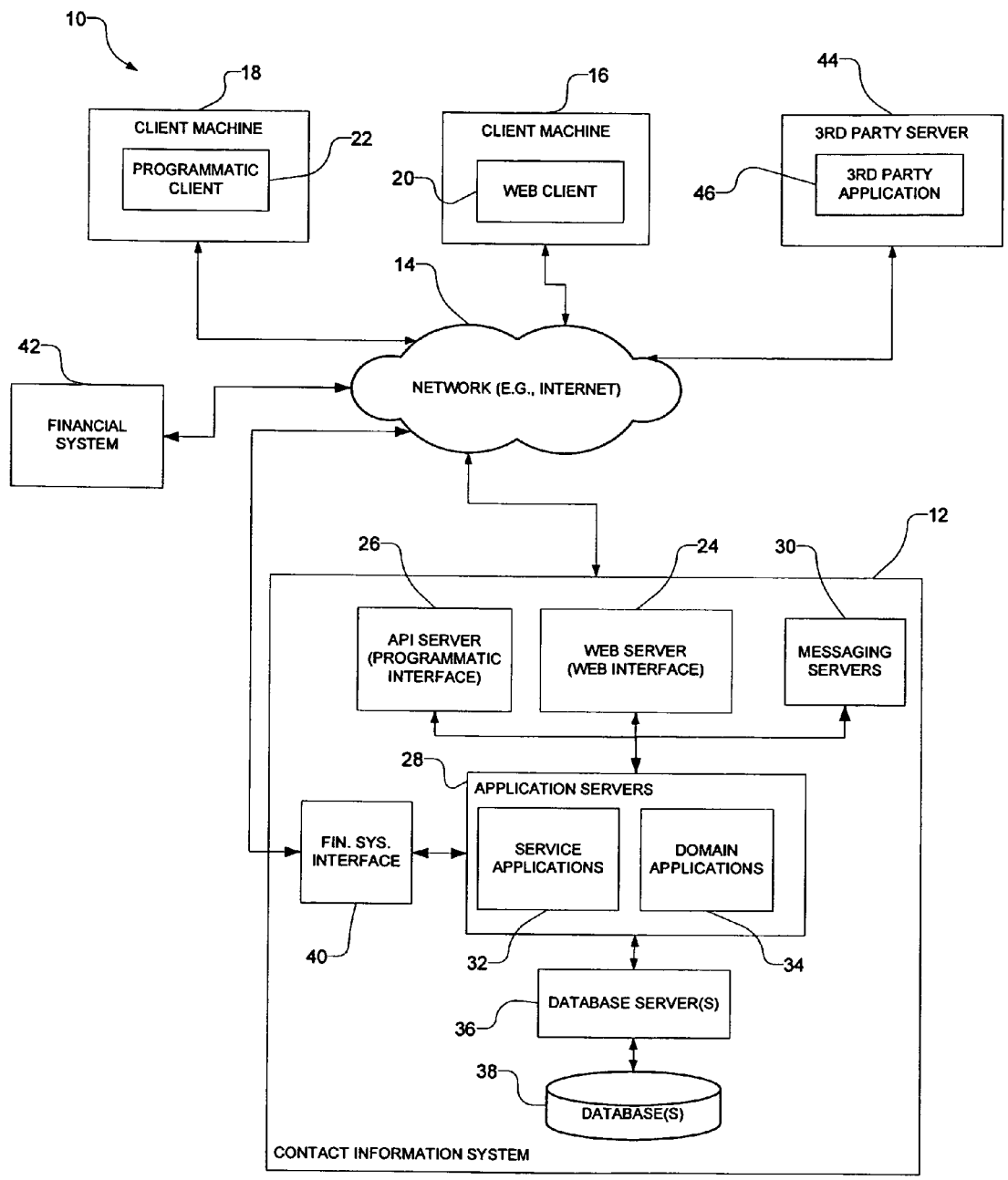
FIG. 1 is a block diagram showing a contact information platform, according to one example embodiment.

FIG. 1 is a block diagram showing a contact information platform 10, according to an example embodiment, having client-server architecture. A contact information system 12 provides server-side functionality, via a network 14 (e.g., the Internet) to one or more client machines 16-18, each of which may host a respective client. For example, the client machine 16 is shown to host a web client 20 (e.g., a browser, such as the INTERNET EXPLORER browser developed by Microsoft Corporation of Redmond, Wash. State or the FIREFOX browser developed by the Mozilla organization). The client machine 16 may be a personal computer for example, or a portable/handheld device hosting a microbrowser (e.g., a browser without a script engine). The client machine 18 is shown to host a programmatic client 22 which capable of programmatic access to the contact information system 12 to exchange and synchronize information stored by the programmatic client 22 and that stored by the contact information system 12.

Turning now specifically to the contact information system 12, web servers 24 and Application Program Interface (API) servers 26 are coupled to, and provide web and programmatic interfaces to, application servers 28 (and other servers such as messaging servers 30). The application servers 28 host both service applications 32 and domain application 34. The service applications 32, in one embodiment, provide web and database services to the domain applications 34, which in turn provide higher-level services, processes and functionalities to users of the contact information system 12. While the platform 10 shown in FIG. 1 is shown to employ client-server architecture, it will of course be appreciated that embodiments of the present application may equally well find application in a distributed, peer to peer or a standalone architecture system.

The contact information system 12 also includes one or more database servers 36 that facilitate access to databases 38. The databases 38 may be implemented as relational databases, and include tables having entries (or records) that are linked by indices and keys. In a further embodiment, the databases 38 may be implemented as collections of objects in an object-oriented database. The databases 38, as will be described more fully below, are populated with tables that store corporate data, including contact information for corporate entities and individuals employed by those corporate entities. This corporate information is received, processed, stored, retrieved, modified and maintained by the service and domain applications 32 and 34.

The contact information system 12 also includes a financial system interface 40 which allows the service and domain applications 32 and 34 to interface with an external financial system 42 (e.g., a bank or a stored value system, such as the PayPal service) via the network 14. In one embodiment, the financial system interface 40 may allow the contact information system 12 to debit and credit, with appropriate authorization, accounts managed by an operator of the contact information system 12 and accounts of users. The transfer of value between accounts held on behalf of the contact information system 12 and users as one or more financial systems 42 may, in one embodiment, be performed by a domain application 34 responsive to the purchase or sale of stored value (e.g., reward points) maintained by the contact information system 12 within the databases 38.

FIG. 1 also shows one or more third party servers 44, hosting third party applications 46 coupled to the contact information system 12 via the network 14. In one embodiment, the third party applications 46 may comprise applications that use corporate data stored by the contact information system 12, and locally process and present this information to users of the third party application. The third party application may access the contact information system 12 via the API servers 26. An example of such a third party application may be a sales force automation application (e.g., the SalesForce.com service).

Figure 2:
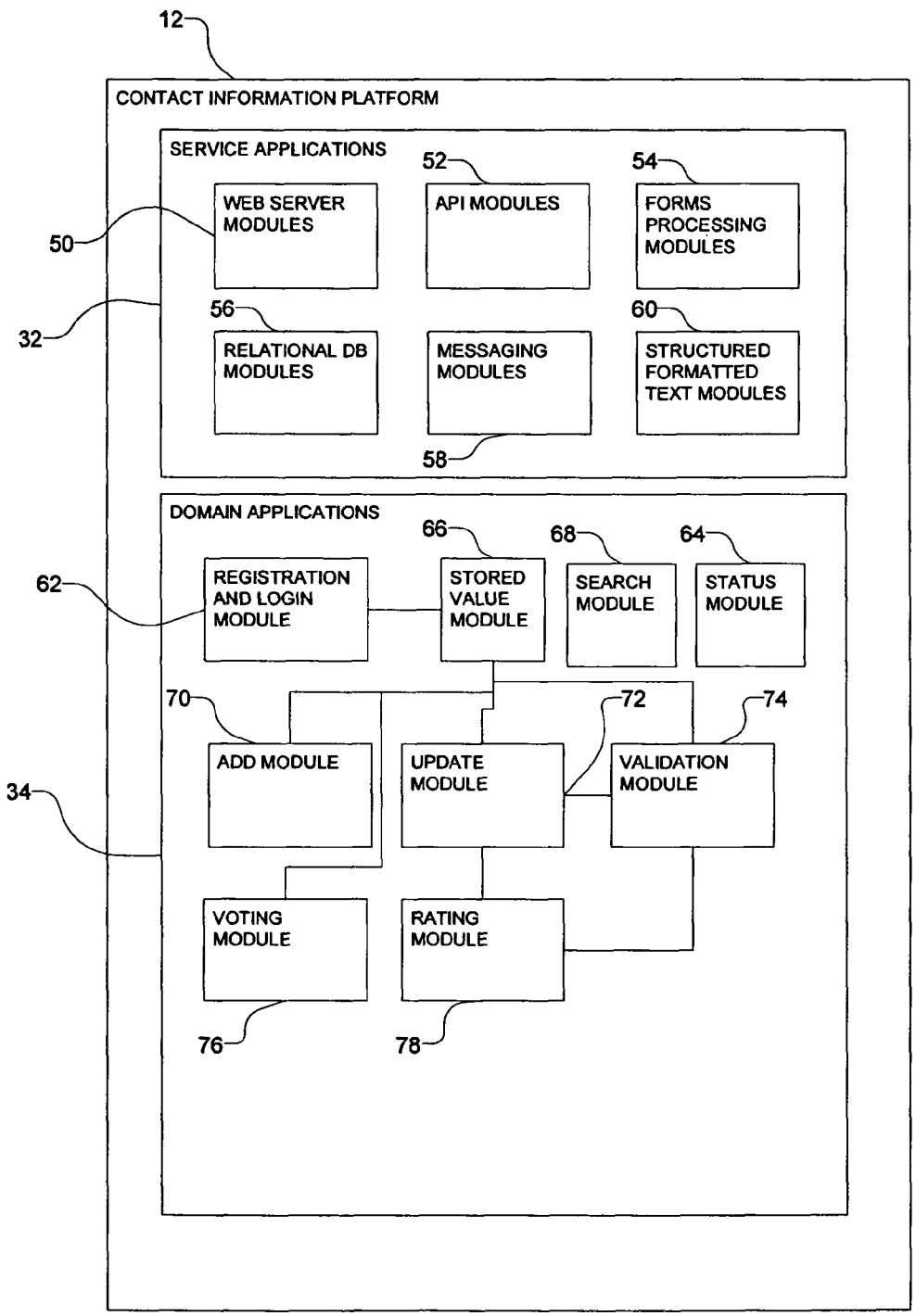
FIG. 2 is a block diagram illustrating various service and domain applications, according to one example embodiment.

FIG. 2 is a block diagram illustrating various service and domain applications 32 and 34, according to an example embodiment, that may be incorporated within the contact information system 12. The service applications 32 are shown to include web server modules 50, API modules 52, form processing modules 54, relational database modules 56, messaging (e.g., email) modules 58, and structured formatted text modules 60.

The web server modules 50 provide a single point of access to other service applications 32 and domain applications 34 for web clients 20 executing on client machines 16. The web server modules 50 are utilized to process web pages that present content (e.g., user interface elements, navigational controls, forms etc.) to a user of a client machine 16. In addition, the web server modules 50 may utilize a variety of web server technologies (e.g., the Apache Web Server etc.), Internet technologies (e.g., Java, J2EE, JSP, Dynamic HTML, Struts Forms and Actions etc.), and comply with web services standards (e.g., XML, HTML, SOAP, etc.).

The API modules 52 provide programmatic access to the service applications 32 and the domain applications 34 for a programmatic client 22 executing on a client machine 18. In one embodiment, the API modules 52 may support a set of functions provided by the service and domain applications 32 and 34, and may support communication between the contact information system 12 and the programmatic client 22 utilizing XML. The API modules 52 enable the development, by external services, of service-based applications by exposing interfaces to the service and domain applications 32 and 34.

The form processing modules 54 provide support services for processing web pages that accept user input from web forms. For example, the forms processing modules 54 provide support to utilize Strut forms and actions, in conjunction with JSP pages and XML technology.

The relational database modules 56 support services for access to the database 38. In various embodiments, the relational database modules 56 may provide support for object relationship mapping, database independence and distributed computing. The relational database modules 56 are utilized to add, delete, update and manage database elements maintained within the databases 38.

Messaging modules 58 are utilized to process incoming and outgoing messages (e.g., email messages) for the contact information system 12. In one embodiment, the messaging modules 58 may utilize the Simple Mail Transport Protocol (SMTP). The contact information system 12 may generate emails, which are stored within the database 38, and that are also communicated to users via the network 14. For example, to process stored emails, the messaging modules 58 may include an email transmitter that asynchronously checks the databases 38, and periodically sends messages (e.g. notifications) as appropriate.

The structured formatted text modules 60 are utilized to provide support for the processing of comma separated value data, for example.

Turning to the domain applications 34, a registration and login module 62 enables registration, login, lost password management, account management, subscription, credit card and referral processing. A status module 64 enables a user to view a chronological listing of transactions (e.g., point transactions) handled by the contact information system 12. For example, various details regarding points that have been earned by a user may be displayed by the status module 64.

A stored value module 66 is responsible for the allocation of awards (or rewards), in the exemplary form of stored value in the form of points, to users of the contact information system 12. The stored value module 66 may allocate rewards to users for any one of a number of actions performed with respect to the contact information system 12. For example, the stored value module 66 may allocate points to a user for registering with the system 12, for referring a further user to the system 12, for adding corporate data (e.g., individual or corporate contact information) to the body of corporate information stored by the system 12, and for performing an action to maintain the validity and currency of the body of corporate information (e.g., for updating, challenging or confirming instances of corporate data).

The search module 68 facilitates user navigation of a body of corporate data, either for example through the performance of keyword searching, attribute searching, or category-based browsing. Further details regarding the search functionality provided by the contact information system 12 are provided below.

An add module 70 enables users of the system 12 to add corporate data (e.g., contact data) to the body of corporate data maintained by the system 12, while an update module 72 enables users to update such information. A validation module 74, as will be described in further detail below, enables users to perform various actions to contribute towards the maintenance, validity and currency of corporate information stored by the system 12.

A voting module 76 operates to enable users to vote for one or more values for a corporate data attribute, the relevant value being otherwise generally unavailable. As will be described in further detail below, the voting module 76 then operates to process such votes, and publish the vote information to users of the contact information system 12. The voting module 76 may also associate one or more values with a particular corporate attribute, based on voting information received from users. A rating module 78 maintains reputation information for users of the contact information system 12 by providing a rating to each user, based on their interactions with, and contributions to, the body of corporate data maintained by the system 12. For example, a user 18 may be enhanced by the provision of corporate data that is later validated, or stands the test of time. On the other hand, the rating of a user may be negatively influenced by the provision of corporate data that is subsequently found to be inaccurate or false.

It will also be noted that the module 62, 70, 72, 74 and 76 are each linked to the stored value module 66, so as to enable, in one embodiment, the stored value module 66 to allocate rewards to users for the performance of functions facilitated by these modules. Further details regarding certain functions performed by the domain applications 34, in conjunction with the service applications 32 will be described in further detail with reference to the figures that follow.

Figure 3:
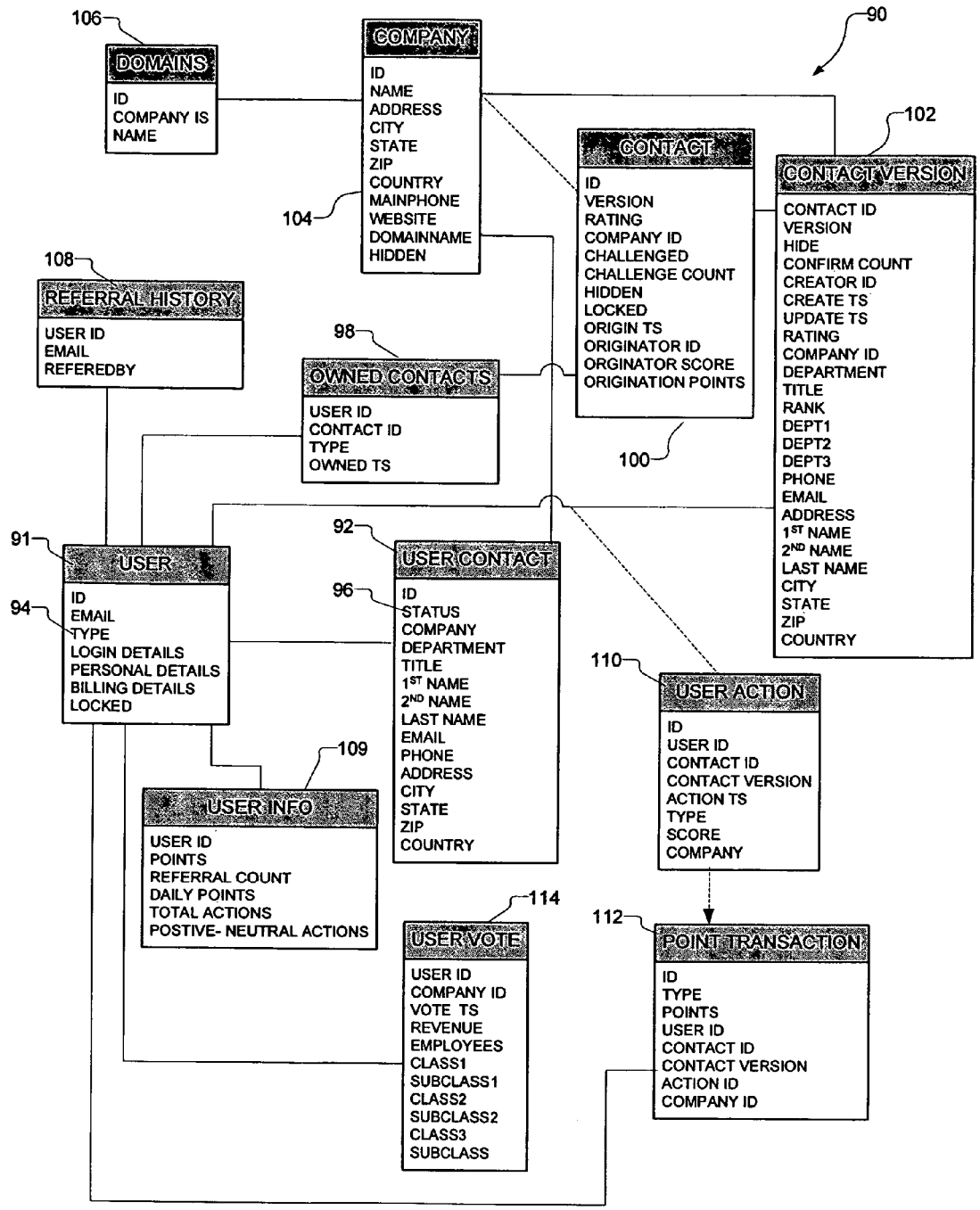
FIG. 3 is an entity-relationship diagram illustrating a collection of tables, according to one example embodiment.

FIG. 3 is an entity-relationship diagram illustrating a collection of tables 90, according to an example embodiment, that may be maintained within the databases 38 of the contact information system 12. An entry is maintained within a user table 91 for each registered user. The user table 91, in addition to storing the shown data regarding a user, also includes a type field 94, which indicates whether the user is an administrative user, a guest user, a subscriber, a complimentary user, or a trial user. As will be described more fully below, the contact information system 12 allows users to maintain collections of corporate data (e.g., in the form of an on-line address book), which may be populated with either information previously owned and contributed to the contact system 12 by the user, or corporate information purchased (or otherwise acquired) from the system 12 by the user. To this end, the tables 90 are shown to include, in an example embodiment, a user contact table 92 which stores contact information, previously owned and contributed by the user, to the system 12. Among the various information items stored within the user contact table 92 is information maintained within a status field 96, the status field 96 indicating whether the relevant contact is from a new (e.g., previously unknown to the system 12) company, a new contact, a confirmed contact or an updated contact.

As mentioned, a user may also have purchased corporate data, in the form of contact information, from the system 12. The purchase contact information for each user is recorded in an owned contact table 98, which links a record in the user table 91, to one or more records in a contact table 100. A unique record exists within the contact table 100 for each instance of contact information. As noted, the contact table 100 maintains for each contact, a record of whether the relevant contact information has been challenged by a user, a count of challenges received, whether the relevant contact information has been withdrawn from publication (e.g., hidden), with an identifier for the originator of the contact information, as well as details of awards that may have been allocated to the originator of the contact.

Of course, different versions of contact information, for a single contact, may be received at the system 12 from different users. For this reason, the tables 90 include a contact version table 102, which may contain multiple records associated with each record within the contact table 100. For example, two different users may have different contact details for a single person. Each of these "versions" of the contact information for the single contact may be stored within the version table 102. The version table 102 is shown to store various information including a hide field indicating whether the relevant version is hidden or exposed by the system 12, a confirmation count field indicating the number of confirmations received from users of the system 12 for the relevant version, as well as other fields of contact information.

Each field within the user contact table 92 and the contact table 100 may furthermore be associated with a record within a company table 104 in which are maintained records for companies, or other corporate entities. One or more domains for each company may also be stored in a domains table 106 that is associated with the company table 104.

Referring to the user table 91, a referral history table 108 maintains a referral history for each user. A user information table 109 maintains information utilized by the rating module 78 to generate a rating for a user (e.g., by examination of positive-neutral actions), and that is utilized by the stored value module 66 to store an allocation (or a deduction) of a stored value (e.g., award points) to the user for various actions performed in connection with the system 12. For example, the various domain applications 34 discussed above may write records to the point transaction table 112 and/or user action table 110 for each stored value allocation, or deduction, operation attributable to the user. The information within the point transaction and user action tables 110 and 112 may be utilized by the status module 64, for example, to calculate a total stored value (e.g. a points balance) for each user. A points field in the user information table 109 may indicate a type of action that led to the allocation, or deduction, of points. For example a points field may identify an event as being a referral event, cash event, a purchase event, a challenge event, an update event, a confirmation event, an origination event, a bonus event etc.

The tables 90 also include a user action table 110 which is populated with records for each user action in connection with the system 12 which results in allocation, or deduction of stored value (e.g. points). The user action table 110 includes a type field that indicates whether the action is an origination, confirmation, challenge or update action, examples of which are discussed in further detail below. The user action table 110 is linked to a point transaction table 112, which includes a type field, indicating whether the relevant user action was a referral, cash, purchase, challenge, update, confirmation, origination or a bonus type action. Further, the points transaction table 112 includes a points field, indicating the number of points earned, or lost, as a result of the user action.

A user vote table 114 is populated with records for each vote cast by a user in connection with a value for one or more corporate data attributes (e.g., revenue, employees and classification). Records within the user vote table 114 are utilized by the voting module 76 to tally and published vote information based on votes received from a number of users. The information contained in the vote table 114 is also used by the voting module 76 to attribute a "top voted" value to a specific attribute. For example, the voting module 76 may identify a certain range of employees (e.g. 100-200) as being the most voted for range, and then identify this range as a "top voted" range for the relevant corporate data attribute.

In one embodiment, each user of the business contact system 12 has a personal address book or contact list. The contact list is made up of user contacts 22 and owned contacts 98. In one embodiment, the contacts in the user's personal contact list may either be made accessible by the user, or kept private or hidden. To this end, contacts which the user wishes to keep private may be flagged as "hidden".

Each contact in the user's personal contact list may further reside in one of a number of states, these states including, for example:

Originated
Purchased
Owned (but not purchased or originated e.g., received for free)
Hidden
Contact not in the contact platform—company exists
Contact not in business contact system—company does not exist
Contact in the business contact system—user's version matches an existing version
Contact in business contact system—user's version does not match an existing version.

For originated, purchased or owned records, the system may further indicate if there are any updates the user has not yet viewed.

Having now described the architecture of, and data structures supporting, the contact information system 12, a description of the various functions performed by the contact information system 12 will be described with reference to a number of user interfaces, in the example form of web pages, generated by the system 12, and flow charts will be provided below.

As alluded to above, in one example embodiment, the contact information system 12 supports a marketplace for corporate information (e.g., contact information) wherein users can accumulate stored value (e.g. a proprietary currency, such as points) with the contact information system 12 through any one of a number of avenues, and then exchange (e.g., redeem) such stored value for corporate information stored by the contact information system 12, such corporate information having been contributed by other users. In the example embodiment, points may be accumulated through user registration with the system 12, referral of another user to the system 12, the supply of corporate information (e.g., individual or contact information), and contributing to the maintenance on the corporate data (e.g. challenging, updating, and/or confirming such data). Having accumulated points, the user may then exchange points for corporate information pertaining to individuals or corporate entities. Accordingly, the marketplace is supported by the provision of stored value to a user in exchange for the receipt of corporate information, and via the exchange of such stored value for corporate information that may have been contributed by other users.

Figure 4:
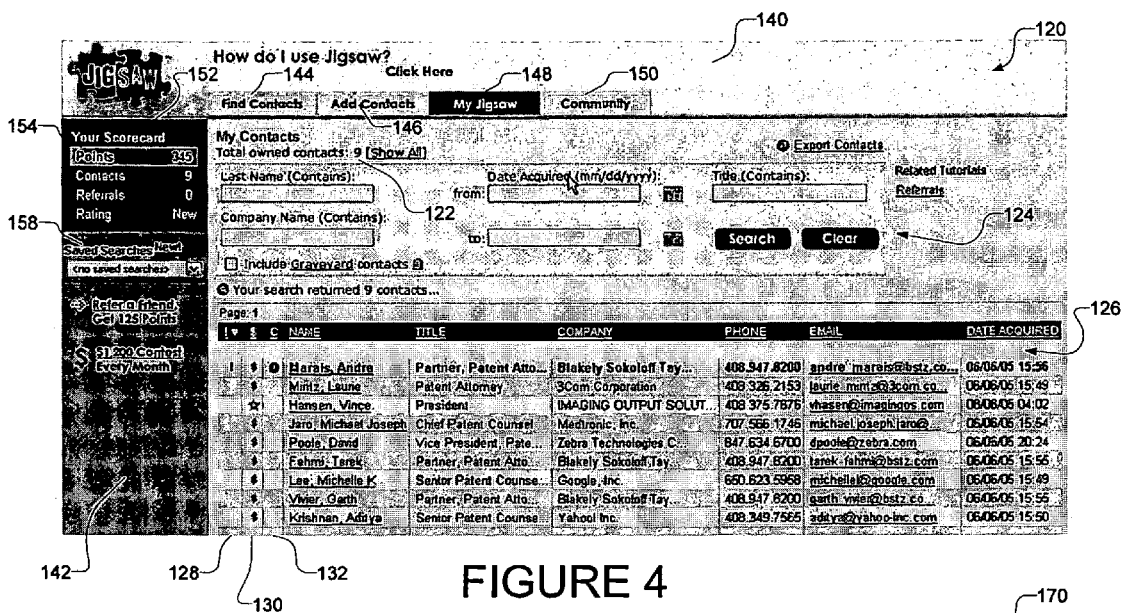
FIGS. 4-7 are representations of user interfaces, according to one embodiment.

By way of introduction to the contact information system 12, FIG. 4 is a user interface diagram illustrating an address book interface 120, according to an example embodiment, that is displayed to a user. In one embodiment, a number of user interfaces, in the form of web pages, generated by the web server 24 of the contact information system 12 have a common navigation header 140, and a common information panel 142. The navigation header 140 is shown to include a number of tabs namely a "find contacts" tab 144, an "add contacts" tab 146, a "my information" tab 148 and a "community" tab 150. Interfaces that are displayed under these various tabs are discussed in further detail below. The address book interface 120 may be invoked by selection of a "my contacts" item in a drop down menu that is generated responsive to the user selection of the "my information" tab 148.

The address book interface 120 provides a total 122 of instances of corporate data, in the example form of individual contact data, which is maintained in an address book for the user at the system 12. The interface 120 further includes a search window 124, into which a user may input data to search contact information stored in his or her address book.

A listing window 126 provides a listing of contact information within the user's address book, this listing being sorted in accordance with criteria inputted into the search window 124. Specifically, within the listing window 126 each record is shown as a respective line item populated with a number of fields. In addition to the name, title, company, phone, email and date acquired fields, a line item also includes a "recently updated" field 128 which may include a visual indication flagging this particular instance of contact information as having been recently updated. An "originated/acquired" field 130 provides indications, for each contact within the address book of whether the contact was acquired (e.g., by the display of a dollar symbol), or originated by the relevant user (e.g., by the display of a star). A "challenged" field 132 further indicates, for each address in the address book, whether this address has been challenged by the display of an appropriate visual indicator (e.g., a red exclamation mark). In the example address book displayed in the listing window 126, it will be noted that the top address is flagged in the "challenge" column as having been challenged by a user of the contact information system 12.

Each line item in the listing window 126 is furthermore hypertext linked to invoke a user entry displaying full contact details (in conjunction with appropriate corporate data and optionally bibliographic data) for the selected contact.

The information panel 142 includes a scorecard window 152, which provides an indication of a total stored value, in the example form of an available points balance 154, a total number of contacts stored in an address book maintained by the system 12 for the user, a referrals indication indicating the number of referrals to the system 12 that have been originated by the user, and a rating indication indicating a rating for the user as determined by the rating module 78.

The information panel 142 also includes a "saved searches" window 158 that provides a drop down menu (not shown) of a search queries authored by the user and stored at the system 12.

Figure 5:
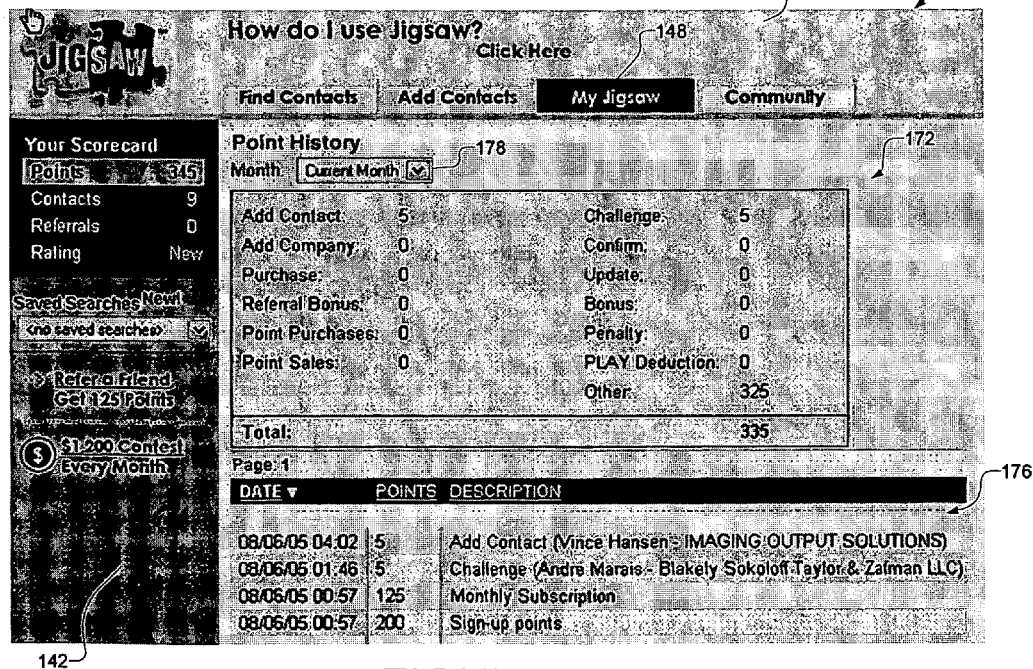

FIG. 5 is a user interface diagram illustrating a "my account" user interface 170 that provides further details regarding stored value, in the exemplary form of points, that have been earned and lost by the user. The interface includes a points history window 172 that indicates, for a month selected by a month drop down menu 178, points that have been earned, or lost, by the user during the relevant month in connection with a number of activities. Specifically, the points history window 172 indicates total points that have been awarded to the user, within the relevant month for adding individual contact information, adding company contact information, purchasing points, referral of other users, challenging information, confirming information, updating information etc. The points history window 172 also provides an indication of any point penalties that have been levied against the relevant user.

A details window 176 provides a line item representation of activities that have occurred within the selected month, and that contributed to the activity totals displayed in the window 172.

Figure 6:
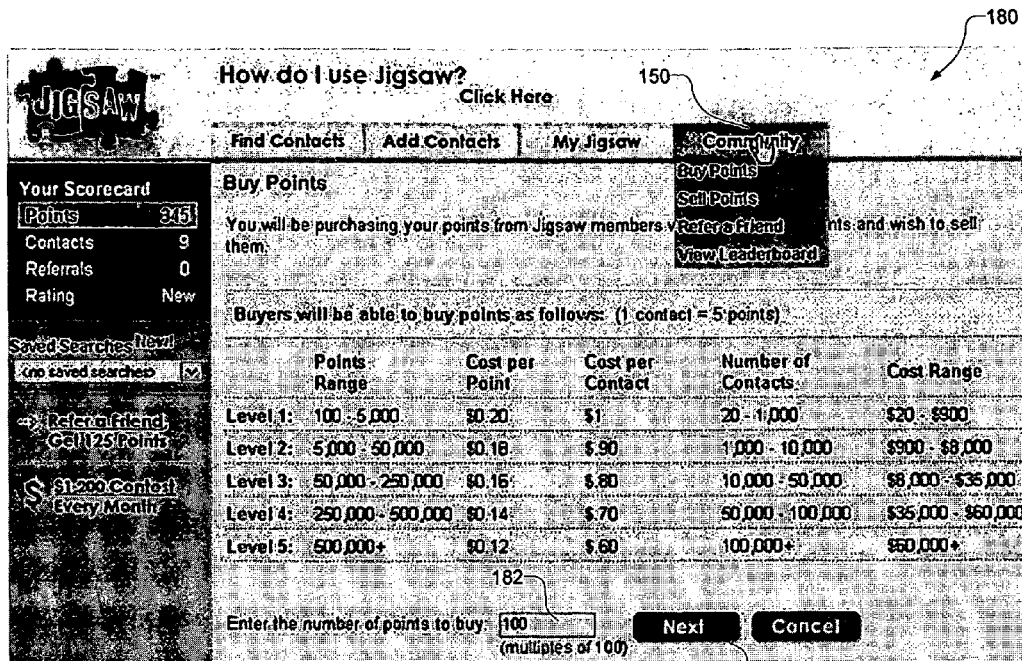

FIG. 6 is a user interface diagram illustrating a "buy points" interface 180, according to an example embodiment, which may be invoked responsive to the selection of a "buy points" option provided in a drop down menu under the "community" tab 150. As noted above, the contacts information system 12 provides a marketplace wherein users can accumulate a stored value redeemable for contact information. In one embodiment, in addition to being able to earn points through the contribution of corporate information, a user may also buy and sell points, these functions being provided by the stored value module 66. In one embodiment, the purchase of points is from a communal pool of points, the pool of points being established utilizing points that other users have indicated as being for sale. In order to provide a fair opportunity for all point-selling users, in one embodiment, a point may be sold from a collection of selling-users to buying-users in a pro rata manner. In other embodiments, other schemes may be utilized to distribute points from the communal pool to buying-users. For example, a purchase of points by a buying-user maybe pro rated across selling-users who have contributed to the pool in relation to the number of points that each of the selling-users has contributed points to the pool. In another embodiment, a first-in-first-out in (FIFO) scheme may be implemented whereby points are distributed to selling-users on an aging basis, with the oldest point contributions being sold first. In yet another embodiment, the distribution of points from the pool could be based on the rating (or other reputation information) pertaining to the selling-users. For example, a selling-user with a high rating could be favored when distributing points from the pool.

Returning now to the buy points interface 180, the interface 180 is the first in a flow of interfaces (not shown), and pricing information for various purchase levels. A purchasing-user may enter the number of points he or she wishes to acquire into the purchase total field 182, and then select a next button 184 to advance the interface flow to the next user interface, which prompts the user for payment instrument details (e.g., a credit card number or a details of PayPal account). At the end of the purchase flow, the number of points inputted to the scorecard window 152 would then be credited to the available points balance of the purchasing user.

Figure 7:
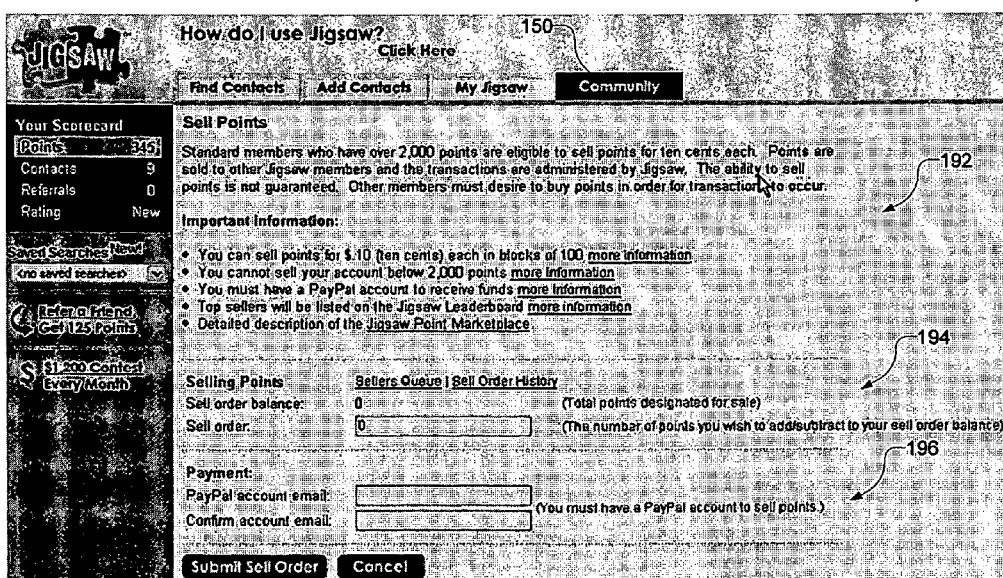

FIG. 7 is a user interface diagram illustrating a sell points interface 190, according to an example embodiment, that may be invoked responsive to user selection of "sell points" option under the "community" tab 150.

The sell points interface 190 includes an information section 192 providing information regarding the point selling process, a selling points section 194 into which the seller can input a number of points to be added to, or subtracted from, a sell order that contributes towards the pool of points that are available for sale via the contact information system 12. The interface 190 also includes a payment section 196 to receive details of an account, maintained by an external financial system 42, into which the selling user is to receive monetary payment in exchange for transfer of points under one or more sell orders.

Having above provided some context regarding functioning of the contact information system 12, various operations supported by the system 12 will now be described in further detail. These operations include the adding of corporate information (e.g., company and individual business contact details) to a body of corporate information maintained by the system 12, the maintenance of a such corporate information (e.g., through the updating, challenging and/or confirming of such information), and also the generation of supplementary corporate information through a voting process and an incentive process will be described.

Figure 8:
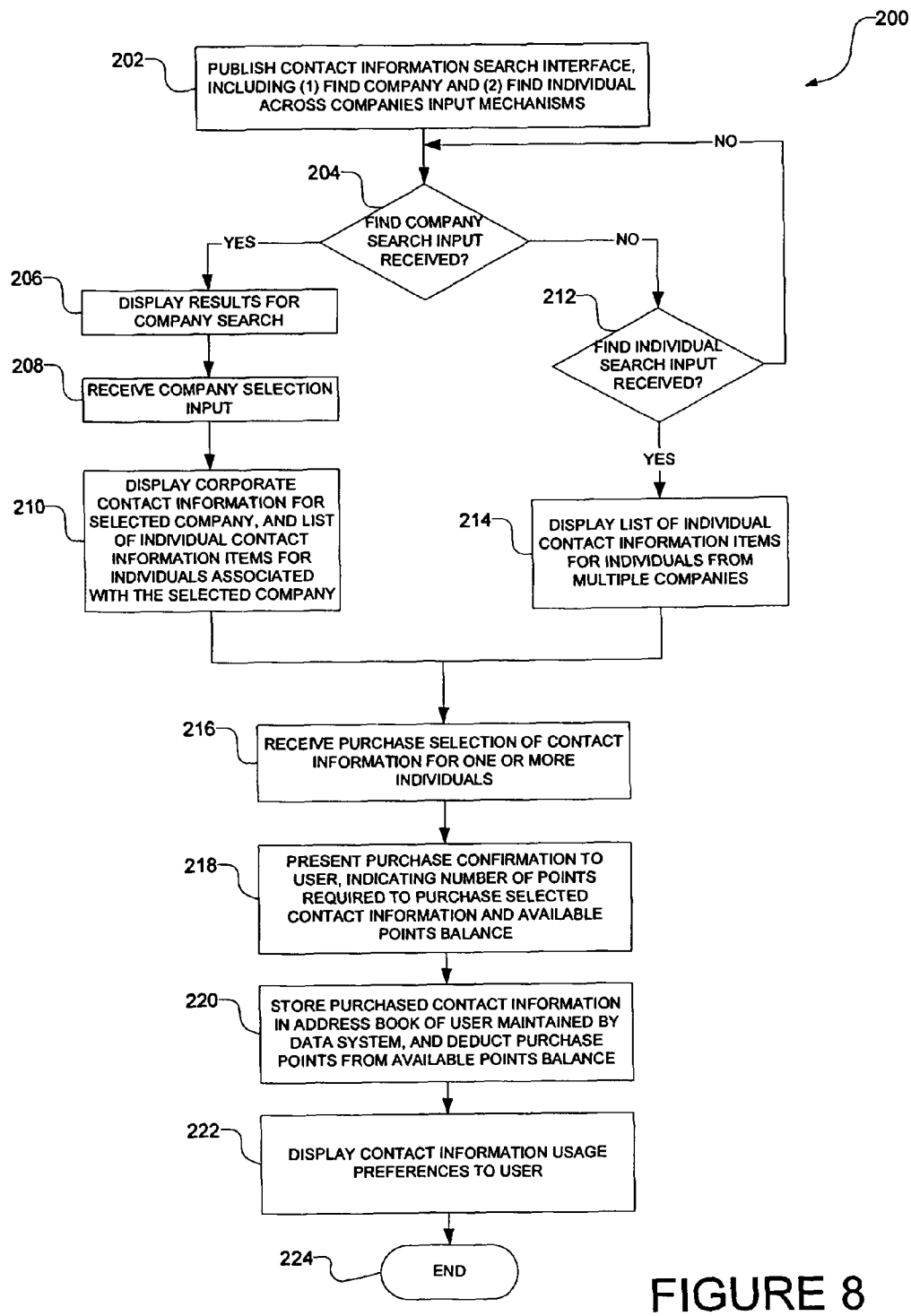
FIG. 8 is a flow chart illustrating a method to redeem stored value for corporate information, according to one example embodiment.

FIG. 8 is a flow chart illustrating a method 200 to redeem stored value (e.g., points) for corporate information (e.g., corporate or individual business contact information) stored by the contact information system 12.

At block 202, the search module 68 publishes a contact information search interface, which includes both mechanisms for locating a corporate entity, and a mechanism for locating individuals across a number of corporate entities.

At decision block 204, a determination is made by the search module 68 whether corporate search input has been received or whether individual search input has been received. If it is determined that corporate search input has been received, the method 200 progresses to block 206, where the search module 68 proceeds to display results based on the company search input received. It may be that the results of the company search, displayed at block 206, include details for more than one corporate entity. In this case, at block 208, the search module 68 may receive, via a web interface supported by the web server 24, a selection of a particular corporate entity contained in the search results.

Responsive to receiving the company selection input at block 208, at block 210, the search module 68 displays a corporate contact information for the selected corporate entity, in conjunction with a list of individual contact data for individuals that are associated with (e.g., are employees of) the selected corporate entity.

Returning to decision block 204, in the event that corporate search input is not received, a determination is made at decision block 212 whether individual search input has been received. If not, the method 200 enters a waiting loop by continuing to loop through decision blocks 204 and 212 until either corporate or individual search input is received.

On the other hand, should individual search input be determined to have been received at decision block 212, the search module 68, at block 214, displays a list of individual contact data items for individuals across multiple corporate entities that match the individual search input. Examples of various user interfaces that may be generated by the contact information system 12 (e.g., the search module 68, operating in conjunction with the web server modules 50 and the form processing modules 54) are illustrated in FIGS. 9-12.

Figure 9:
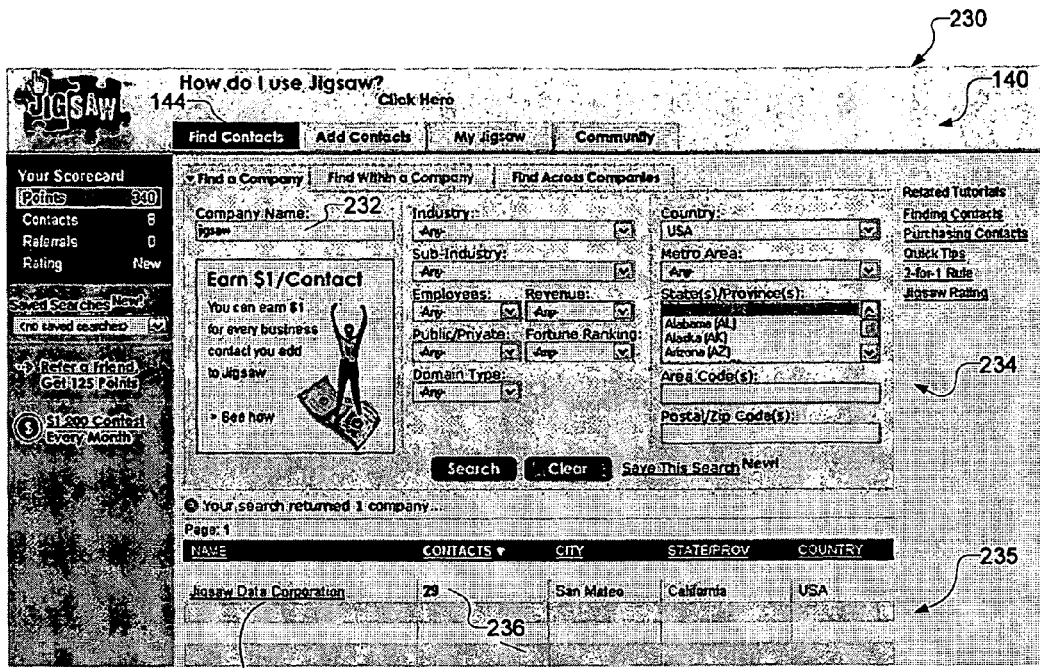

FIG. 9 is a user interface diagram illustrating a "find a company" interface 230 that may be published at block 202, as an example of an information search interface. The "find a company" interface 230 may be invoked by a user responsive to a user selection of the "find contacts" tab 144 within the navigation header 140. The "find a company" interface 230 is one of three search interfaces that are generated responsive to user selection of the "find contacts" tab 144, the other interfaces being a "find within a company" interface 240, illustrated in FIG. 10 and the "find across companies" interface 250 illustrated in FIG. 11.

Dealing now specifically with the "find a company" interface shown in FIG. 9, the interface includes a company name field 232 and a collection 234 of filter criteria that may be user inputted to limit the scope of a search on the name inputted into the company name field 232. As shown in FIG. 9, a search on the input "jigsaw" into the company name field 232 provides a list of results in a listing section 235 of the interface 230. In the provided example, the search returned only a single result namely a line item for the corporate entity "Jigsaw Data Corporation", this entry within the listing section 235 being hypertext linked to invoke the "find within a company" interface 240 shown in FIG. 10. It will also be noted that the line item in the listing section indicates at 236, the number of individual contacts that are stored at the contact information system 12 for the located corporate entity.

Figure 10:
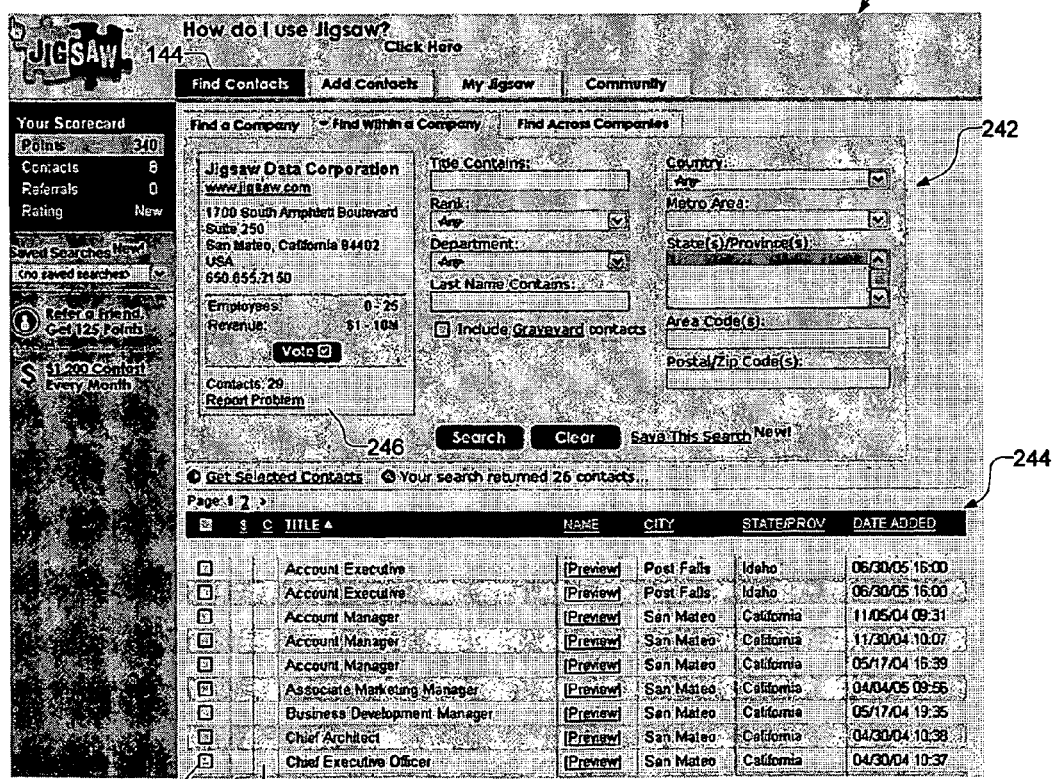

FIG. 10 is a user interface diagram illustrating the "find within company" interface 240, according to an example embodiment. The interface 240 is, as noted above, generated responsive to user selection of a particular corporate entity from a search log returned as a result of a search conducted through the "find a company" interface 230. The "find within a company" interface 240 has two sections, namely a search section 242 and a listing section 244. The search section 242 includes a corporate data window, displaying corporate contact information, and a set of a search input fields into which a user can input search criteria for the location of an individual associated (e.g., an employee) with the corporation whose data is displayed within the window 246.

The listing section 244 displays a list of line items, contact details for individuals associated with the relevant corporate entity, as filtered by the criteria inputted into the search section 242. It will be noted that the contact detail line items displayed within the listing section 244 displays the title of the relevant individual within the corporate entity, as well as geographic location data and a date on which the individual's contact data was received by the contact information system 12. However, actual contact details, and the names of the relevant individuals are not displayed in the listing section. Additionally, the listing section provides check boxes 248 for each line item, thereby to enable a user to select a set of contact details from the line items displayed in the listing section 644 for purchase, as will be described in further detail below.

Figure 11:
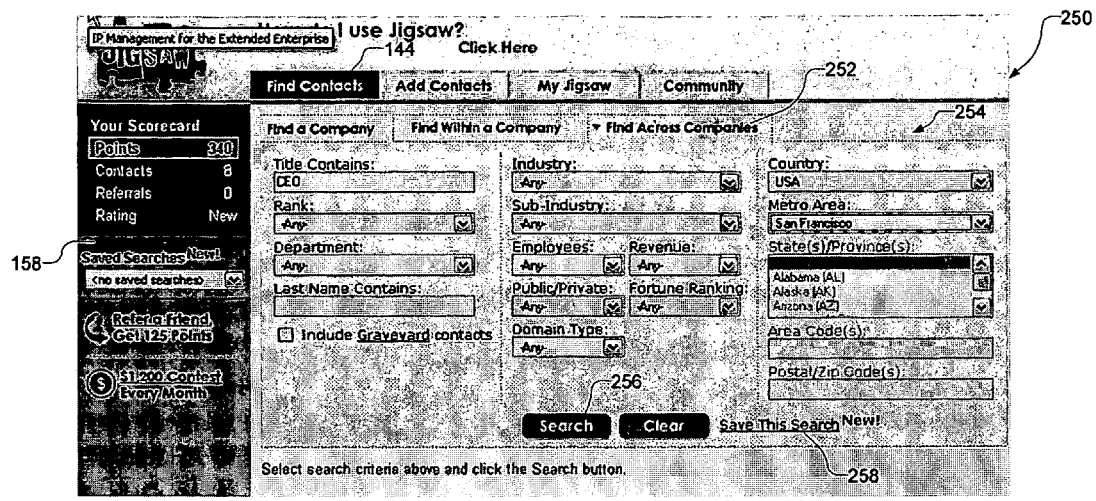
Figure 12:
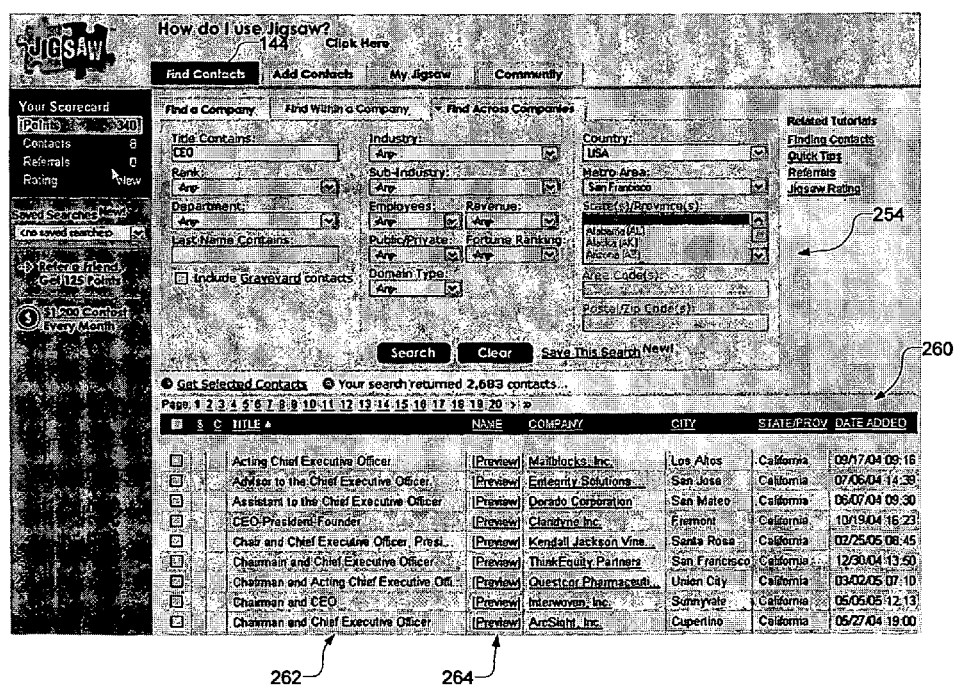

FIG. 11 shows an example embodiment of the "find across companies" interface 250, this interface being invoked responsive to a user selection of "find across companies" sub-tab 252. The "find across companies" interface 250 includes a search section at 254 into which a user can provide individual search input criteria, such as title, rank, department etc. The interface 250 also includes a search button 256 that is user selectable to communicate a search query, based on the received individual search input to the contact information system 12. Additionally, the interface 250 includes a "save the search" option 258, which is user selectable to save the individual search input received into the interface. A user selection of the option 258 will cause the saved search to be made available in the drop down menu presented within the saved searches window 158 of the information panel 142. The contact information system 12, responsive to receiving individual search input provided into the interface 250, may then regenerate the interface 250 to include a listing section 260, as shown in FIG. 12, the listing section again displaying line item contact information for individuals, across multiple corporate entities that satisfy the individual search input. Within the listing section 260, each contact record is shown in conjunction with, inter alia, a title at 262, and a respective "preview" option 264, user selection of the preview option 264 generating a redacted version of the contact information that does not include the name of the relevant individual, nor the email address or any other direct contact information. Each line item within the listing section 260 is also flagged as already having been purchased by the relevant user, or having been originated by the user in an "originated/acquired" field 130, or being challenged (if applicable) in a "challenged" field 132.

In summary, it will be appreciated that the interfaces discussed above with reference to FIGS. 9-12 may, in one embodiment, be generated and communicated to a user of the contact information system 12 as part of the operations performed at blocks 202-214 of the method 200 shown in FIG. 8.

Returning to the method 200 shown in FIG. 8, at block 216, the contact information system 12, and more specifically the search module 68, receives a purchase selection of contact data for one or more individuals from the user.

At block 218, the search module 68 presents purchase confirmation information to the user, indicating the number of points required to purchase the selected contact data (purchase points), and an available points balance of the user.

Responsive to receiving confirmation of the purchase from the user, at block 220, the relational database modules 56 update the tables 90 to effectively store the purchased contact data in an "address book" of the user maintained by the contact information system 12. Further, the stored value module 66, at block 220, deducts the purchase points from the available points balance of the user thereby directing a predetermined value from a stored value from the user responsive to the communication of the selection of contact data to the contact information system 12. Having purchased business contact data for one or more individuals, at block 222, the contact information system 12 may display contact data usage preferences, associated with the purchased contact details, to the purchasing user. Specifically, in one embodiment, a user whose contact information is stored and owned by the contact information system 12 may specify preferences relating to the usage of his or her business contact information. For example, the preferences may indicate that the relevant individual willing to receive requests of a certain type, but that requests of a different type should be directed to someone else in his or her organization. The method 200 then ends at termination block 224.

FIGS. 13-17 illustrate various examples of user interfaces that may be generated and communicated to a user by the contact information system 12 during the performance of the operations at blocks 216-222.

Figures 13, 14:
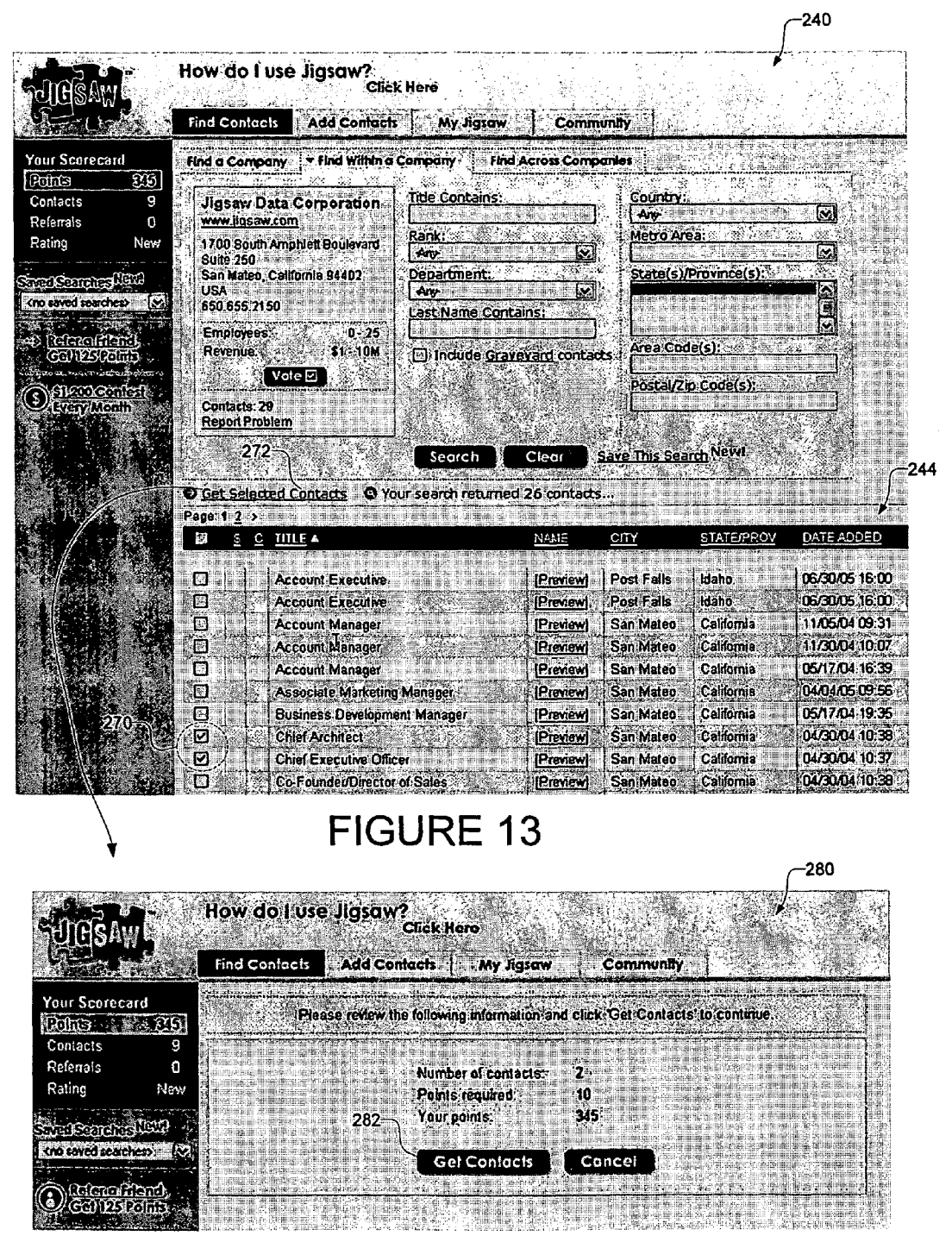

FIG. 3 again shows an example "find within a company" interface 240, in which two contact detail line items have been selected, by user activation of the appropriate check boxes at 270, for purchase. A user selection of the "get selected contacts" link 272 then causes a purchase selection of contact data for the relevant individuals to be communicated to, and received by the contact information system 12. Responsive to receipt of the purchase selection, the system 12 generates and delivers a purchase confirmation interface 280, an example of which is shown in FIG. 14, to the purchasing user. As shown, the purchase confirmation interface 280 indicates the number of contacts being purchased, the value (e.g., points) required to purchase the contacts, and an available points balance. The interface 280 includes a "get contacts" button 282, which is user selectable to confirm the purchase of the contact information. The purchased contact information is then, as described above, added to the o "address book" of the purchasing user, and the appropriate stored value (e.g., points) are deducted from the available points total maintained by the stored value module 66 for the purchasing user.

Figure 15:
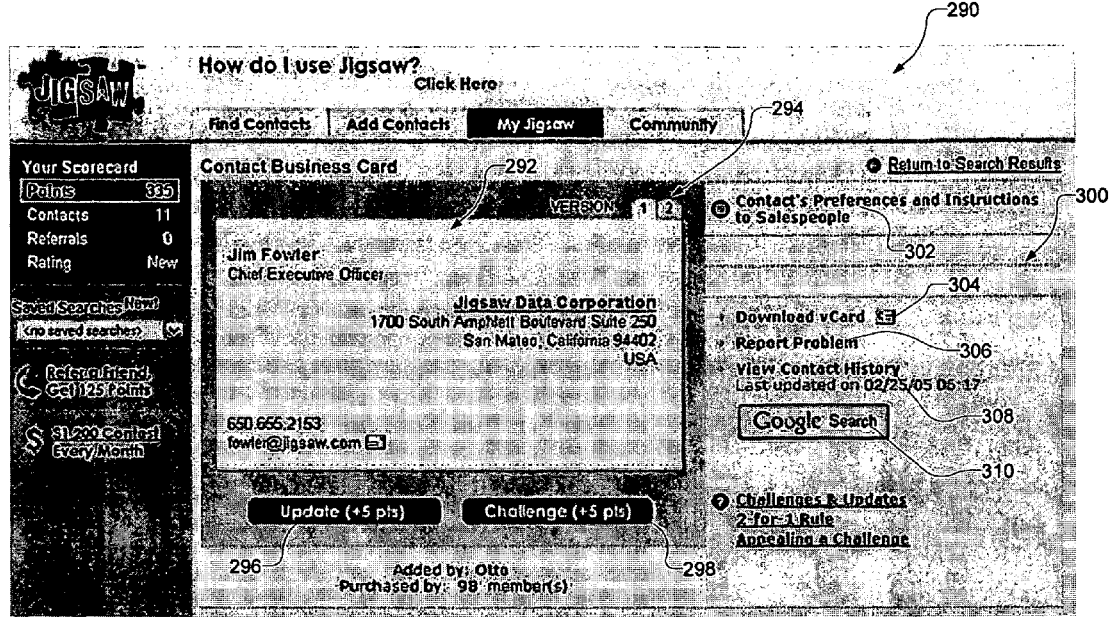

FIG. 15 illustrates a contact business card interface 290, according to an example embodiment, that may be generated by the contact information system 12 to thereby present purchased contact information to a user. For example, the interface 290 may be generated responsive to user selection of a contact line item displayed within the address book interface 120 shown in FIG. 4.

The contact business card interface 290 includes a business card portion 292 that displays business contact details for an individual that would typically be included on a business card that the user would freely hand out to potential business acquaintances. It will be noted that version tabs 294 are provided in conjunction with the displayed contact data, where more than one version of contact data is stored for the relevant individual. Utilizing the version tabs 294, a user can select between different versions of the individual's contact information. The business card portion 292 also includes an update button 296, which is user selectable to invoke an update process whereby the user may update the information of the individual, this update process being described in further detail below. The business card section 292 also includes a challenge button 298, which is user selectable to challenge the data of the individual as displayed.

The contact business card interface 290 also includes an actions section 300, including a preferences link 302, which is user selectable to display preferences regarding usage of the displayed business contact information, a download link 304 to download the business contact information as a V-card, a report problem link 306 that is user selectable to invoke a problem reporting interface (e.g., see FIG. 23), a "view contact history" link 308 that is invokeable to display a revision history with respect to the contact details, and a search link 310 that is selectable to invoke a search, via a commercial search engine, based on the business contact information.

Figure 16:
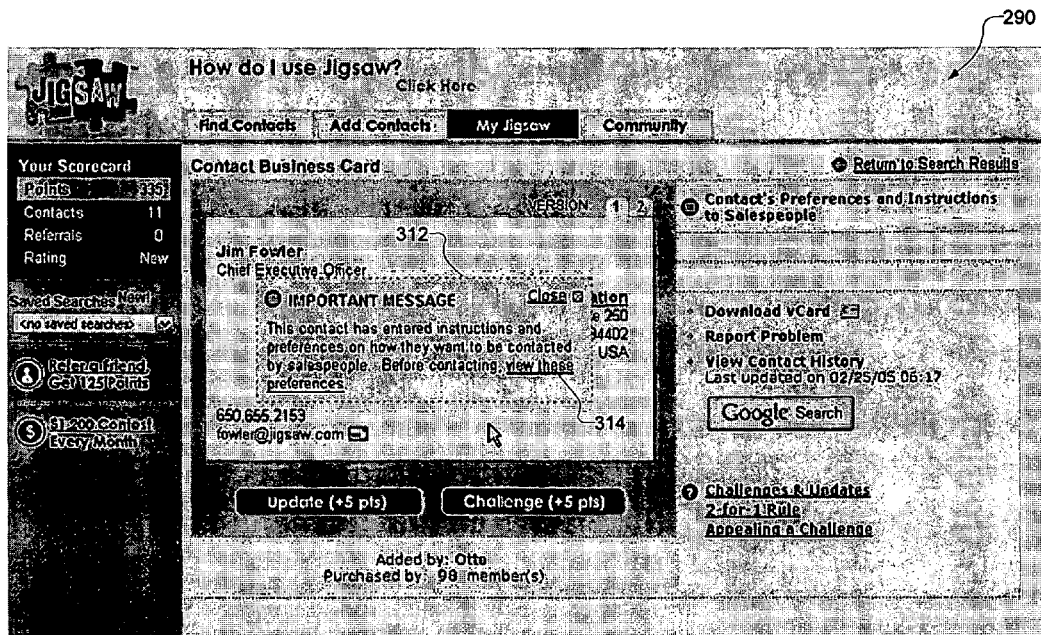

FIG. 16 illustrates a further view of the contact business card interface 290, in which a preferences notification has been automatically generated and displayed in conjunction with the business contact information, thereby alerting a user viewing this information regarding the preferences. The preferences notification 312 includes a preferences link 314 that is selectable to again cause a display of preferences.

Figure 17:
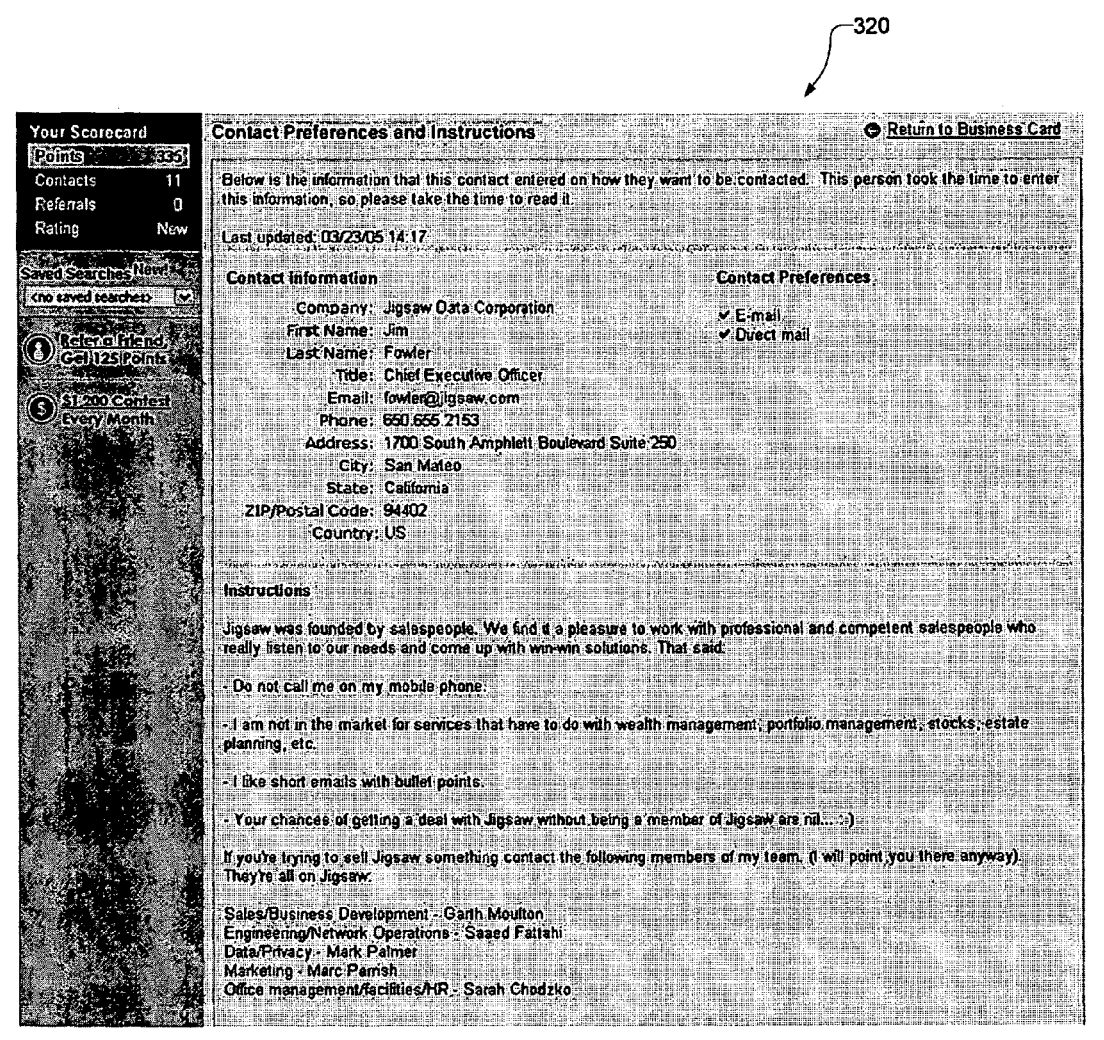

FIG. 17 is a user interface diagram illustrating a contact preferences and instructions interface 320, which may be displayed responsive to user selection of the link 302 or the link 314.

Figure 18:
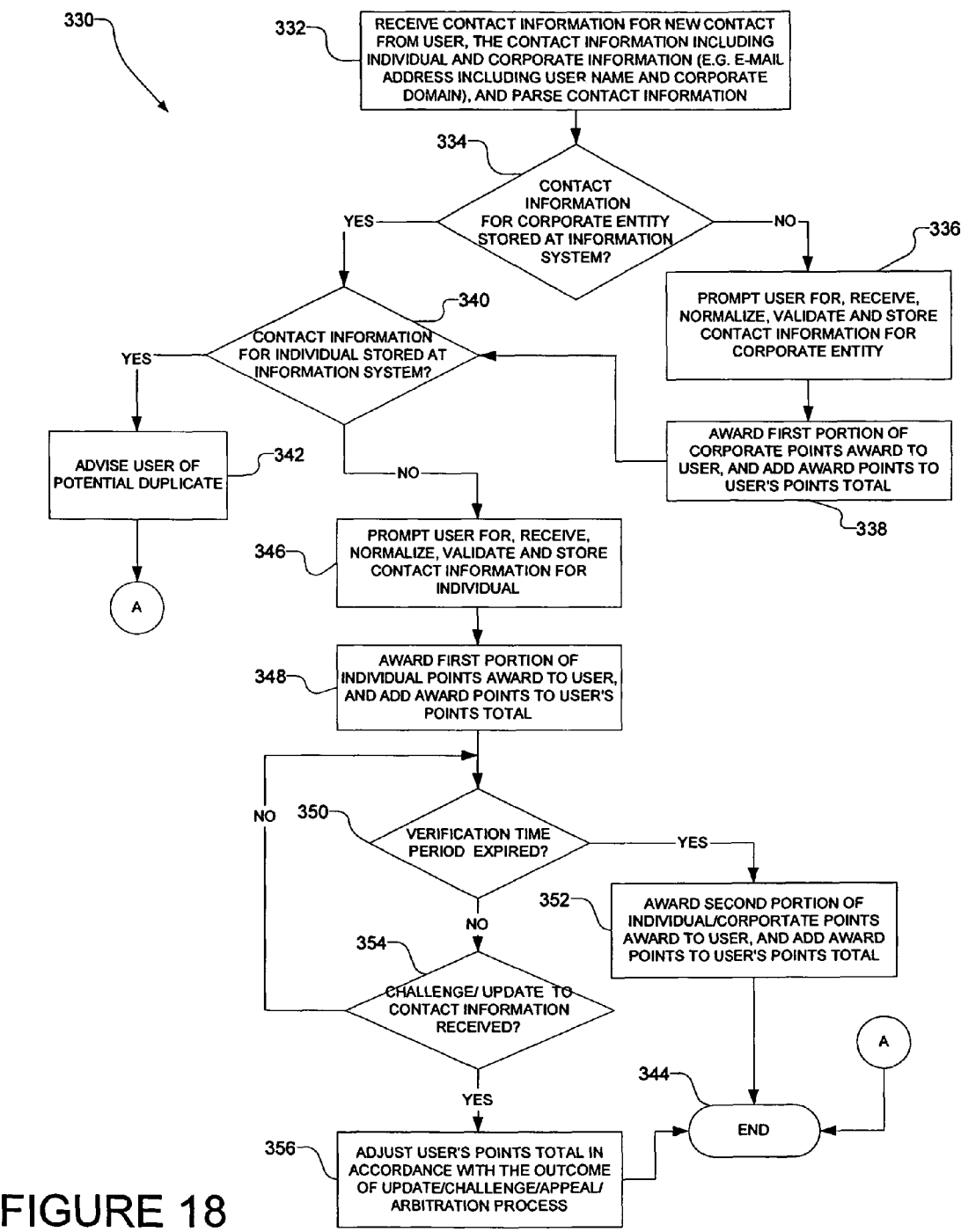
FIG. 18 is a flow chart illustrating a method, according to an example embodiment, to incentivize the provision of corporate information.

FIG. 18 is a flow chart illustrating a method 330, according to an example embodiment, to incentivize the provision of corporate information (e.g., business contact information) to the contact information system 12. The method 330 commences at block 332 with the receipt of business contact information, at the contact information system 12, from a first user. The business contact information (e.g., an email address) is received via an interface (e.g., a programmatic interface or a web interface) of the contact information system 12, having been transmitted to the system 12 via the network 14. In one embodiment, the business contact information includes both individual data (e.g., an individual's name, title, rank, division, email address, direct telephone number etc.) and corporate data, (e.g. a company name, company address details etc.). Certain of the received contact information may comprise a hybrid of individual and corporate data, such an email address which includes a username that is specific to the individual, and a corporate domain that identifies a corporate entity with which the individual is associated. At block 332, the received contact information is also parsed to differentiate between the contact data for the corporate entity, and the contact data for the individual. For example, the email address may be parsed to extract the username and to extract the domain name associated with the corporate entity.

Figure 19:
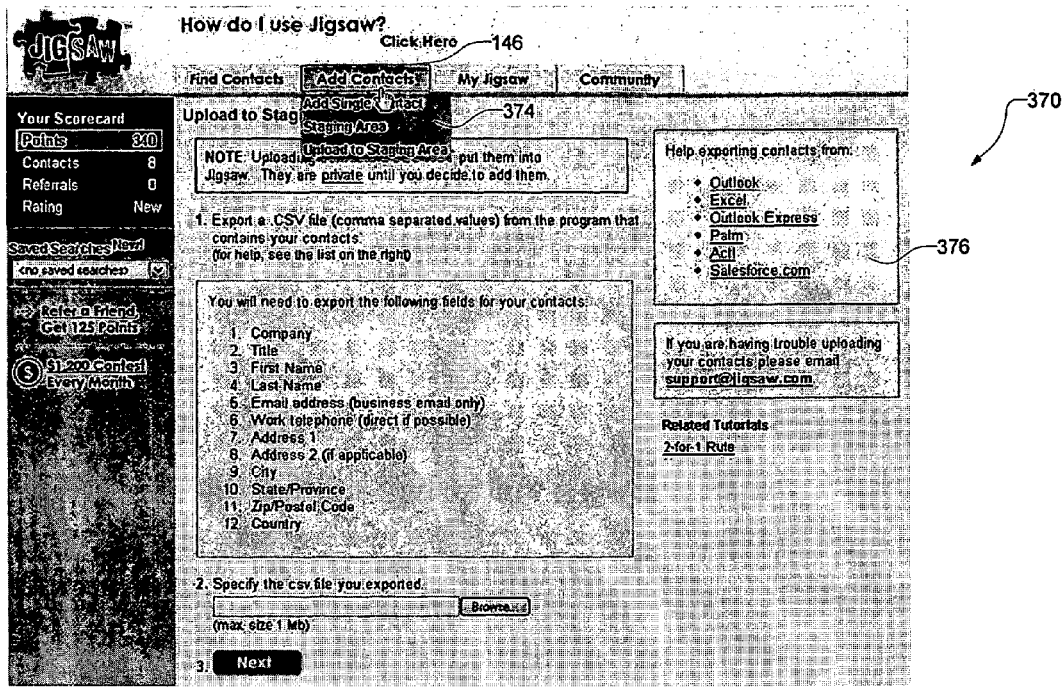
FIGS. 19-24 are representations of user interfaces, according to one embodiment.
Figure 20:
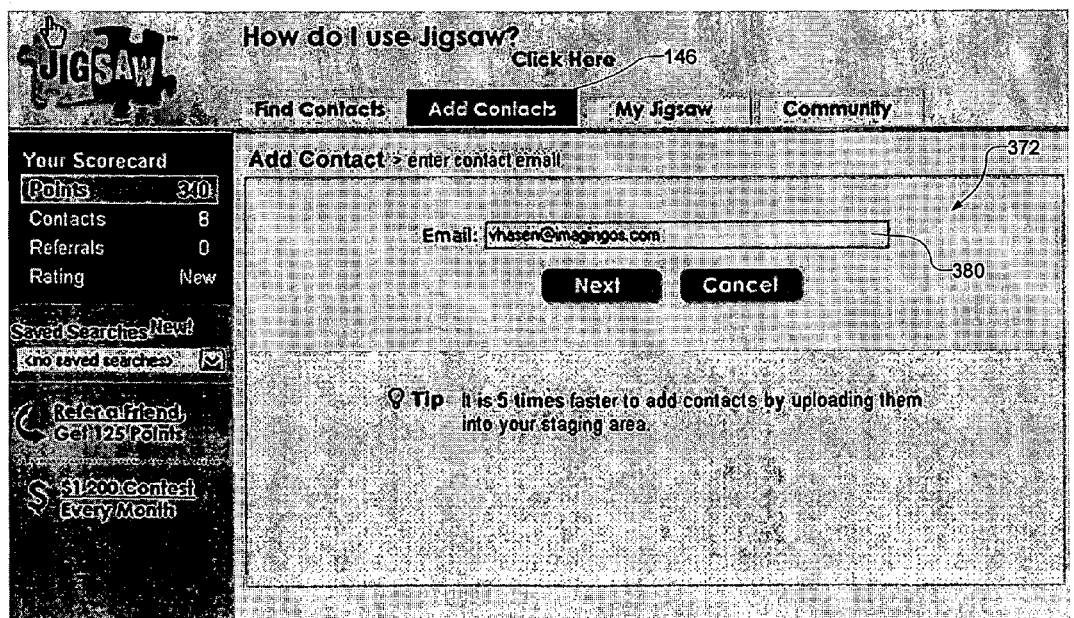

FIG. 19 and FIG. 20 are user interface diagrams illustrating respective add contact interfaces 370 and 372, according to an exemplary embodiment, that may be communicated to a user at block 332 for the purposes of obtaining business contact information. The add contact interface 370 may be invoked by user selection of the "add contacts" tab 146 within the navigation header 140. The interface 370 provides details regarding the provision of contact information to a "staging area" maintained by the contact information system 12. A staging area is a data storage location at which a user may upload contacts in preparation of publishing them, via the contact information system 12, in exchange for stored value (e.g. points).]

Having parsed the email address at block 332, at decision block 334, the corporate data (e.g., the domain name of the email address) is utilized to identify a corporate entity, and a determination is made as to whether business data for the relevant corporate entity is stored at the contact information system 12.

User of selection of the "add contacts" tab 146 invokes a drop down menu 374, which provides the options of invoking a number of process flows, namely an "add single contact" process flow, a "staging area" process flow and an "upload to staging area" process flow. To this end, the contact information system 12 provides two ways for the provision of contact information to the system 12, namely a single entry via a web form, and a file upload of multiple entries. Turning first to the single entry by a web form, the exemplary interfaces shown in FIGS. 20-24 provide examples of how such a single entry process flow operates. Utilizing this manner of data provision, users may add new contacts to their personal contact lists (or address books) one contact at a time. By default, when a user submits information utilizing the web form methodology, the contact record may be added to their personal contact list, as well as submitted for publication via the contact information system 12. Users may also, in an alternative embodiment, be able to add a contact to their personal contact list, without submitting the contact information for publication via the system 12.

Turning to the file upload methodology, as an alternative to adding contacts one at a time to their personal contact lists, users may utilize an upload wizard to communicate a list of contacts to the system 12. Such a list may be exported from several leading contact management applications, examples of such contact management applications are provided in the export help block 376 of the interface 370. In one embodiment, structured formatted text exports from Microsoft Outlook, Palm Pilot, ACT!, Salesforce.com, and excel spreadsheets may be accepted.

The upload wizard operates to detect when a contact being uploaded is a duplicated one that is already in the personal contact list of the user, and may in the situation ask the user if the wizard should prompt the user for each duplicate individually, ignore all duplicates, or add all duplicates to the personal contact list. If prompted individually for each record, the user may be able to decide whether to ignore each duplicate, or add it to their personal contact list.

The add contact interface 372 is invoked responsive to user selection of the "add single contact" item from the drop down menu 374, and provides an email field 380. A user can provide contact information in the form of an email address of the individual whose contact information is to be provided to the contact information system 12. This email address is then parsed, at block 332 of the method 330, to extract the individual information (e.g., "vhasen") and to extract the corporate domain (e.g., "imagingos.com").

Returning to the method 330 shown in FIG. 18, at block 334, a determination is made by the add module 70 whether data (e.g., contact data) for the corporate entity is already stored by the contact information system 12. This determination may be made by the add module 70 performing a lookup in the domains table 106, illustrated in FIG. 3, to determine whether the domain extracted from the email address is stored within the domains table 106.

In the event that data for the corporate entity is not already stored at the system 12, the method 330 progresses to block 336, where the user is prompted, via appropriate interfaces for data regarding the relevant corporate entry. Such corporate information, having been provided into relevant forms generated by the forms processing modules 54, is then received at the system 12 via an appropriate interface (e.g., the web interface), and then subject to a normalization process and a validation process, prior to storage in the databases 38, and specifically within the company table 104. The data normalization may include, for example, the normalization of various acronyms such as "Blvd" to "Boulevard" and "Ste." to "Suite".

Regarding of the validation process, the add module 70 may operate to apply criteria to the corporate information received at block 336. For example, the corporate information provided may be required to include a minimum set of information, including the URL for a website with its primary domain, and the name of at least one employee.

At block 338, the corporate information having been stored in the databases 38, the stored value module 66 proceeds to award a first portion of a corporate points award (e.g., 10 points) to the user, thereby effectively adding the awarded points to the user's balance of available points. Following a positive determination at decision block 334, or following completion of the award operation at block 338, the method 330 progresses to decision block 340, where a determination is made as to whether contact information for the relevant individual is stored at the contact information system 12. Again, this determination may be made by the add module 70, utilizing the user name as parsed out of the email address received at block 332. If a record for the individual already exists within the system 12, the user seeking to add the contact is advised of the potential duplicate at block 342, and the method may then terminate at block 344.

In other embodiments, on detection of a potential duplicate, as opposed to terminating the receipt of contact information, the system 12 may nonetheless allow the user to submit the new contact information and determine whether it exactly matches the already stored contact information, or exhibits some variations. In the event that the exhibits variations, the newly added contact information (for an already known individual) may be stored as a different version of the contact information within a new record in the contact version table 102.

Returning to decision block 340, if contact information for the individual is not stored at the system 12, the user is prompted for a full set of contact information for the individual at block 346. Further, at block 346, this full set of contact information is received, and again subject to a normalization and validation process, prior to being stored in the contact version table 102.

The normalization process may again normalize certain information items received as part of the full set of contact information. For example, the title field may be automatically normalized from "Dir" or "Eng" to the words "Director" and "Engineering". To this end, subsequent to receiving the contact information, the system 12 may prompt the user to accept the normalized alternatives. As part of the validation process, the system 12 may also utilize USPS or other services to standardize and check postal addresses.

During receipt of the contact information, the address and phone number for the individual may default to that of the corporate entity identified at decision block 334. Further, the system, in the validation process, may reject certain email addresses that have high a likelihood of being personal email addresses (e.g., email addresses from a number of popular web-based email services, such MSN Hotmail, Yahoo! and Google). The validation process may also apply various filters to detect generic emails (e.g., sales@jigsaw.com).

In a further embodiment, the validation process may also prohibit certain phone numbers from being included in the contact information received at block 346. For example, in certain jurisdictions, the prefix for a phone number (or the area code) may identify the phone number as being a mobile number. The validation process may employ one or more filters to detect the attempted provision of mobile telephone numbers, and disallow or block receipt thereof Finally, the validation process also checks that a complete record of contact information has been submitted, and that no required fields within an input form have been omitted.

Figure 21:
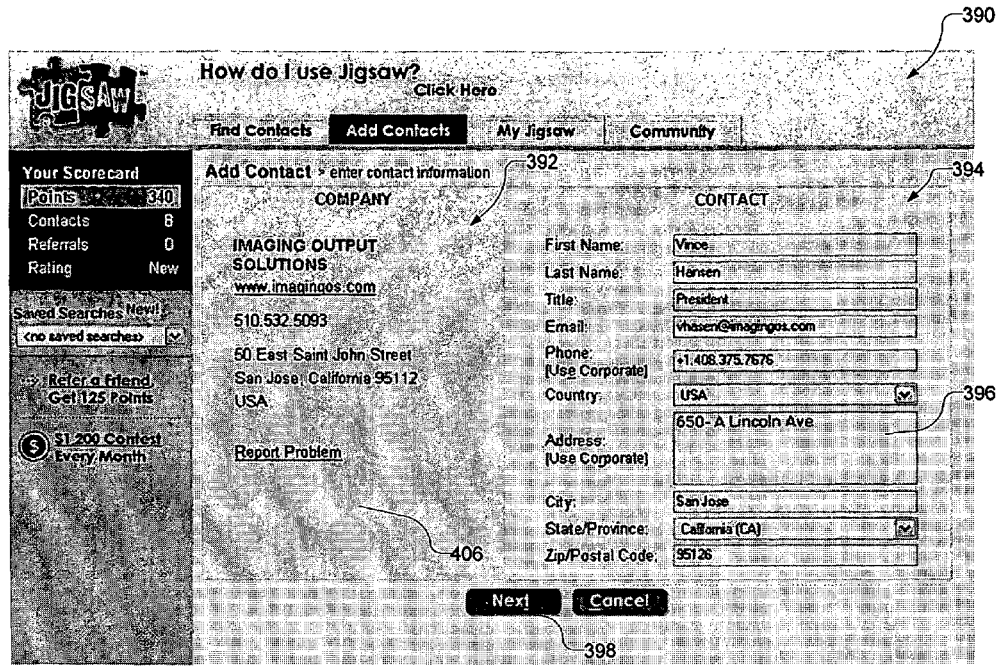

FIGS. 21-24 illustrate a sequence of add contact interfaces, according to an example embodiment, that may be generated in the form of web pages by the contact information system 12. FIG. 21 illustrates an add contact interface 390 including a company section 392, showing information from a corporate entity that owns the domain of the email address entered into the email field 380 of the user interface 370 shown in FIG. 20. In one embodiment, at least the contents of an address field 396 defaults to the address of the corporate entity reflected in the company section 392. The contact section 394 prompts the user for a set of contact information for the relevant individual by presenting a number of labelled input fields into which the user can supply the relevant information, and then select a "next" button 398 to advance the input flow to the next step.

Figure 22:
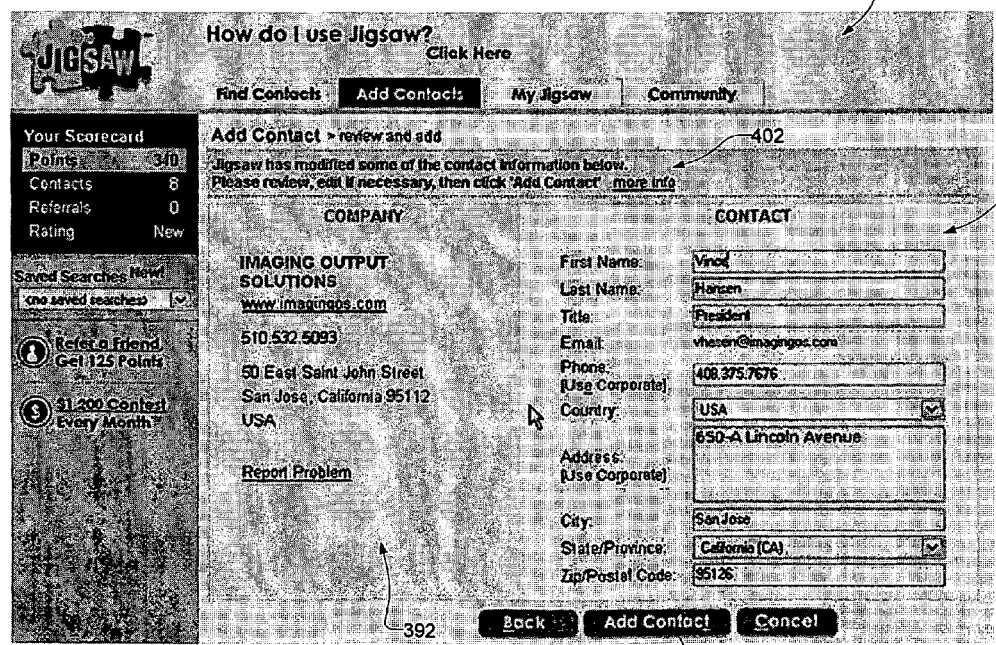

Having received the contact information inputted into the add contact interface 390, the system 12 may display the add contact interface 400, shown in FIG. 22, to a user. It will be noted that the interface 400 includes a notification that the system 12 modified certain of the contact information provided into the interface 390. For example, the abbreviation "Ave" has been replaced with the word "Avenue" in the interface 400. The notification 402 further requests that the user review the modification to the contact information, edit this modification if necessary, and then click an "add contact" button 404.

Any one of a number of notifications, which result from the normalization and validation process as described above, may be included within the interface 400 and presented to the user for review, editing and/or acceptance.

Figure 23:
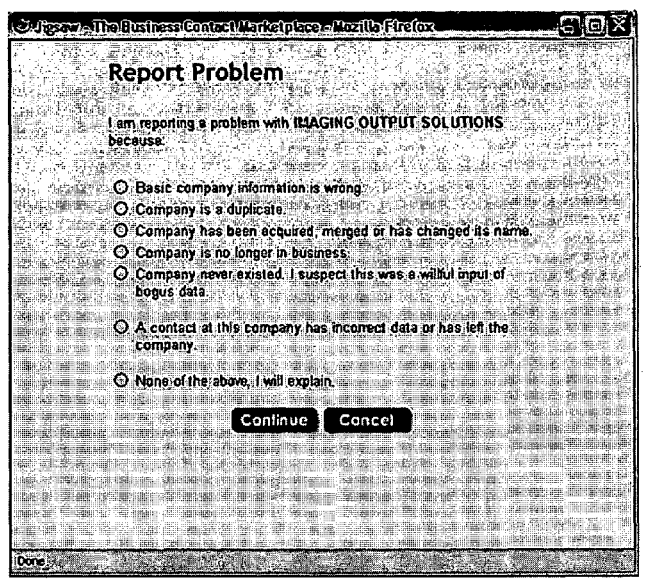

In connection with the company sections 392 of the interfaces 390 and 400, each of these company sections 392 includes a "report problem" link 406 that is user selectable to invoke a problem reporting process, whereby a user can report any one of a number of problems pertaining to the corporate information displayed in a company section 392 of an interface. FIG. 23 illustrates a "report problem" interface 410, according to an example embodiment, that may be invoked responsive to user selection of a "report problem" link 406. As shown, the interface 410 presents a list of problems recognized by the system 12, each problem description being associated with a respective radio button that a user can activate to communicate a problem in connection with the corporate information to the system 12.

Figure 24:
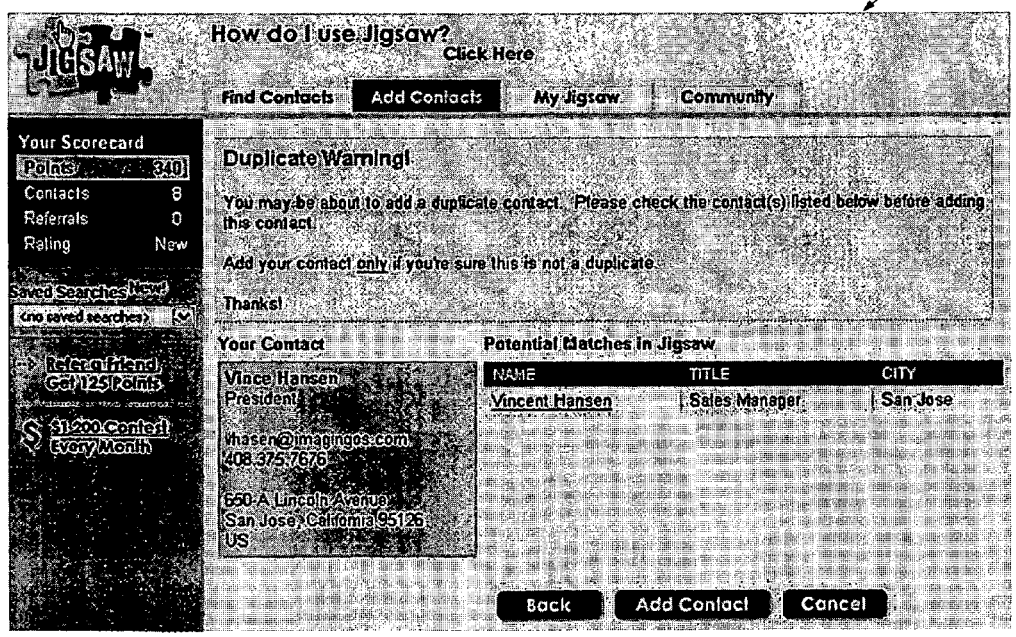

FIG. 24 illustrates a duplicate warning interface 420 which may be generated and communicated to a user at block 342 of the method 330, to advise a user of a potential duplicate entry for an individual.

Returning again to FIG. 18, following storage of the contact information for the individual at block 346, at block 348 the stored value module 66 proceeds to award a first portion of an individual points award to the contributing user, and adds the awarded points to the available points balance of the user. For example, the first portion of the individual points award may be an initial points award of five points.

At block 350, a determination is made as to whether a verification time period in connection with the received corporate and/or individual information has expired. For example, the system 12 may publish the corporate and/or individual information received at blocks 336 and/or at block 346 subject to verification for a period of 30 days. In the event that the verification time period has not expired, a determination is made at decision block 354 whether a challenge or an update to the contact information has been received from other users of the system 12. If not, the method loops back to decision block 350. On the other hand, should a challenge or update to the contact information have been received, at block 356 an available points balance for the submitting user may be adjusted in accordance with the outcome of an update, challenge, appeal or arbitration process, examples of such processes being discussed in further detail below.

Returning to decision block 350, should the verification time period be determined to have expired, the method progresses to block 352, where the stored value module 66 then proceeds to award a second portion (e.g., bonus points) of the individual and/or corporate points awards to the user, and adds the awarded points to an available points balance for the user. For example, upon expiration of the verification time period, the add module 70 may provide the submitting user with five bonus points for individual contact information.

The method 330 then ends at block 344. In one embodiment, the corporate and individual points awards are different, with a higher number of points being allocated for the receipt of information regarding a previously unknown corporate entity than is awarded for the receipt of previously unknown individual contact data.

Further, the points awarded to a submitting user within the context of the method 330 may be redeemable for contact information, pertaining to another entity, and potentially submitted by another user. In this manner, the system 12 supports marketplace functionality.

Figure 25:
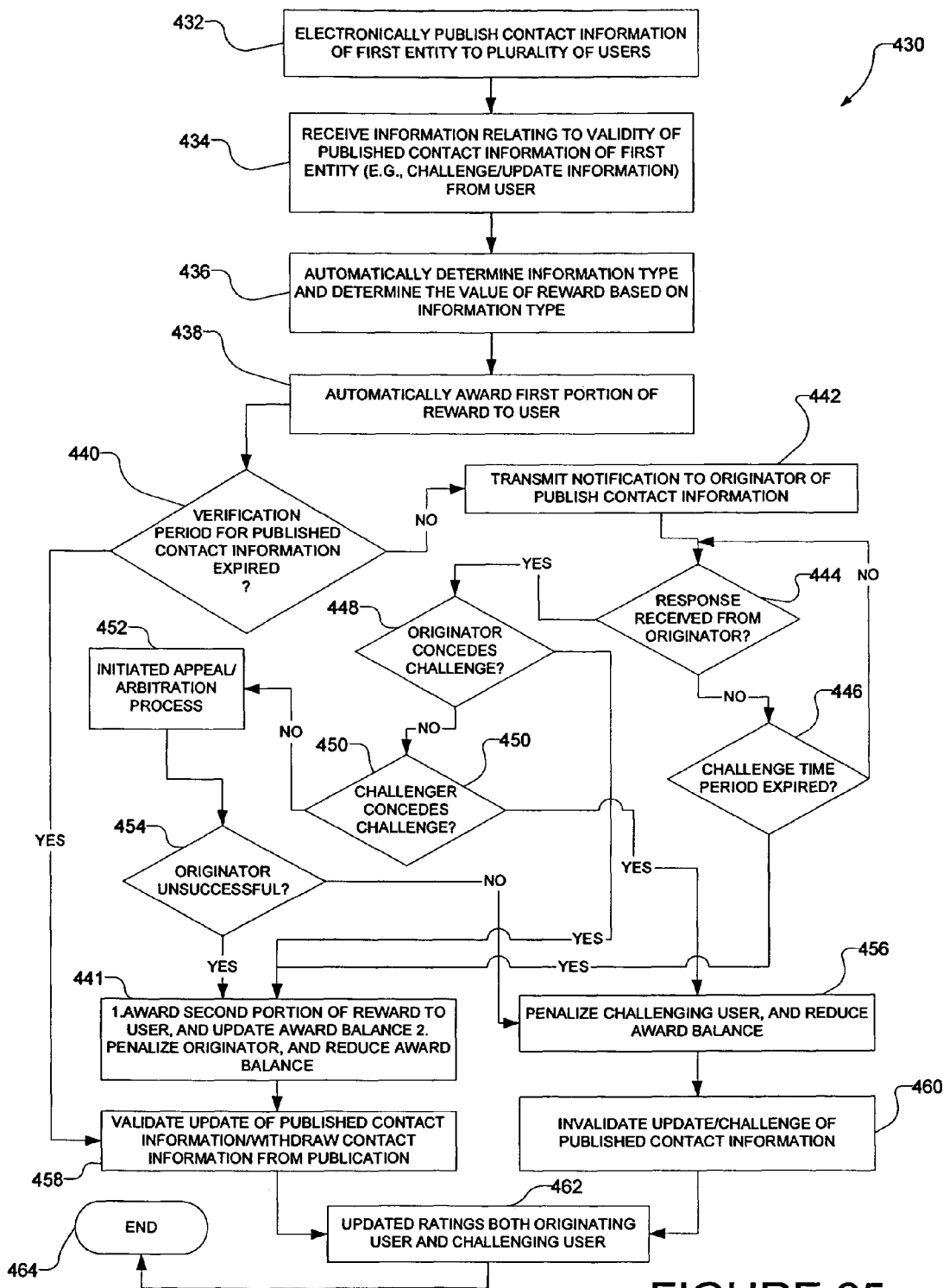
FIG. 25 is a flowchart illustrating a method, according to an example embodiment, to maintain published contact information.

FIG. 25 is a flowchart illustrating a method 430, according to an example embodiment, to maintain published contact information stored by the contact information system 12.

At block 432, the contact information system 12 publishes contact information of a first entity (e.g., an individual or a corporation) to a number of users of the contact information system 12. This publication of the contact information may, for example, be the display of contact details for an individual maintained within the personal contact list (or address book) of a user, subsequent to a purchase of the contact information in the manner described above.

At block 434, the contact information system 12 receives information relating to the validity of the published contact information of the first entity. For example, considering the contact business card interface 290 as shown in FIG. 15, the interface is shown to include an update button 296 and a challenge button 298. The information received regarding the validity of the published information may be update or challenge information indicating that a user wishes to update or challenge the electronically published contact information.

In one embodiment, a user is encouraged by the contact information system 12 to challenge a contact if a contact is known to have left, or become disassociated with, a corporate entity, or if an email to a reflected email address bounces and a phone number for the entity does not work. Users are discouraged from challenging the validity of the contact information merely on the basis of a bounced email. Further, users are encouraged to update contact information for an entity if the contact is known still to be associated with a respective company, and the updating user has access to correct contact information. For example, the address of a particular corporation may have changed, in which case an updating user, utilizing the update button 296 may invoke a process whereby the contact information for the corporate entity may be updated. Responsive to the updating of the contact information, a new virtual "business card" may be created for the contact. Further, if more than one version of business contact information exists for an individual, the update is made to the most recent version.

Returning to the method 430, at block 436, the validation module 74 of the contact information system 12 automatically determines the information type (e.g., challenge or update) received at block 434, and determines the value of a reward based on the information type. For example, in one embodiment, a higher value reward may be provided for a challenge than for an update, or vice versa.

The validation module 74 then, at block 438, communicates with the stored value module 66 to automatically award a first portion (e.g., five initial points) to the user, and may add this first portion of the reward to an available points balance maintained by the system 12 for the user.

The method 430 then progresses to decision block 440, where it is determined whether a verification period for the published contact information has expired. Specifically, the contact information system 12 may institute a verification period (e.g., 30 days) following the submission of contact information to the system 12 wherein the originator of the contact information is notified of any validity or correctness issues pertaining to a submission that they have made.

If the verification period is deemed to have expired, the originator is not included in the process and the method progresses directly to block 458, where the update published contact information is validated (in the case of an update), or the contact information is withdrawn from publication (after a predetermined expiration period (e.g., again 30 days)).

On the other hand, should the verification period for the published contact information not have expired, at block 442, the validation module 74 initiates transmission of a notification of receipt of the information regarding the validity (e.g., the challenge or update) to the published content information.

At decision block 444, if a response is not received from the originator, it is determined whether a challenge time period in connection with the challenge or update has expired. For example, upon receipt of an update or a challenge to published content information, a 30-day period may be provided for the originator to respond to notification of the update or challenge. If the challenge period has not expired, the method then loops back to decision block 444.

On the other hand, should a response from the originator have been received, at block 448 the validation module 74 determines whether the originator has conceded to the challenge or update. If so, the method again jumps to block 441, where the stored value module 66 awards a second portion of the reward, for receipt of the information regarding validity, to the challenging user, and updates an award balance (e.g., available points balance) for that user. The stored value module 66 may also penalize the originator of the contact information (e.g., by ten points, or applying a ten point penalty), and then reducing an award balance total for the originator by the appropriate number of points.

On the other hand, should the originator not concede the challenge, the method 430 progresses to decision block 450, where a determination is made as to whether the challenger concedes the challenge, in light of the response received from the originator. If the challenger does in fact concede, the method progresses to block 456, where the challenging user is penalized (e.g., by reducing the challenging user's available points balance by a predetermined points penalty (e.g., ten points)). On the other hand, should the challenger not concede the challenge, a genuine dispute is then recognized to have risen between the originator and the challenger, and the contact information system 12 may then institute an appeal or an arbitration process at block 452 between the challenger and the originator.

Should the originator of the contact information then be unsuccessful, as determined at decision block 454, the method then again proceeds to perform the operations discussed above with reference to block 441. On the other hand, if the originator is successful in overcoming the challenge, the method again progresses to block 456, where the challenging user is penalized.

It should also be noted that following a successful challenge or update at block 441, the method progresses to block 458, where the update of the published contact information is validated, in the case of an update, or the contact information is withdrawn from publication (e.g., relegated to being a "graveyard" contact).

On the other hand, should the challenge or update be defeated, following the penalizing of the challenging user, at block 460, the update or the challenge to the published contact data is invalidated. From each of blocks 458 and 460, the method 430 then progresses to block 462, where ratings for both the originating user and the challenging user are updated. For example, if the originating user was successful in defending the originally published contact information, a rating for the originating user may be increased, or at least maintained. While the rating for the challenging user may be reduced. On the other hand, should the originating user be defeated, the rating for the originating user would be decreased, and that for the challenging user increased or at least maintained. Accordingly, a rating may be regarded as the aggregate of ratings for all actions (e.g., add, update and challenge actions) that a user performs with respect to the contact information system 12. The rating may, in one embodiment, be calculated as a percentage of actions that are either positive or neutral. For example, a rating of 95% means that the relevant user received a negative rating 5% of the time.

While the method 430 is described above as being applicable to published contact information, it will be appreciated that, once an update to published contact information is validated at block 458, the update would then in fact be regarded as published content information, and the challenger would then migrate into the role as an "originator" of the updated information. Accordingly, once an update has been validated, a challenger may challenge that updated information.

Further, originators are encouraged to appeal updates that are considered to be trivial. Examples of trivial updates may include correcting punctuation, fixing minor spelling errors, rearranging word order (e.g., "Director of Marketing" to "Marketing Director"), changing a first name to a nickname (e.g., "Mike" to "Michael"), completing partial but mostly correct first name (e.g., "Rob" to "Robert"), completing first names that are initials (e.g., "J.R. Smith" to "John Robert Smith"), completing partial words that are clear in meaning (e.g., "network admin" to "network administrator"), adding a suffix or professional designation, and spelling of acronyms that have four letters or more. Examples of non-trivial updates may include updating a phone number or address from a corporate phone number or address to a direct phone number or address, spelling or acronyms that are three letters or less, and completing names with only one letter (e.g., "J. Smith" to "John Smith").

In one embodiment, when a user challenges contact information, the record may be "locked" for a predetermined period (e.g., 90 days). During this period, the contact information system 12 may refuse to allow users to add a contact that matches in a version of the locked contact period. During this period, the contact information may continue to be displayed to users when they view their personal contact lists. However, at the end of the 90-day period, the lock record may no longer be displayed (e.g., withdrawn from publication) when a user views their personal contact list. After the 90-day period, the contact may then again be entered into the contact information system 12 as a new contact.

In a further embodiment, the information relating to the validity of the contact information may be a confirmation indication received from a user, confirming the validity of the contact information published by the originating user.

Figure 26:
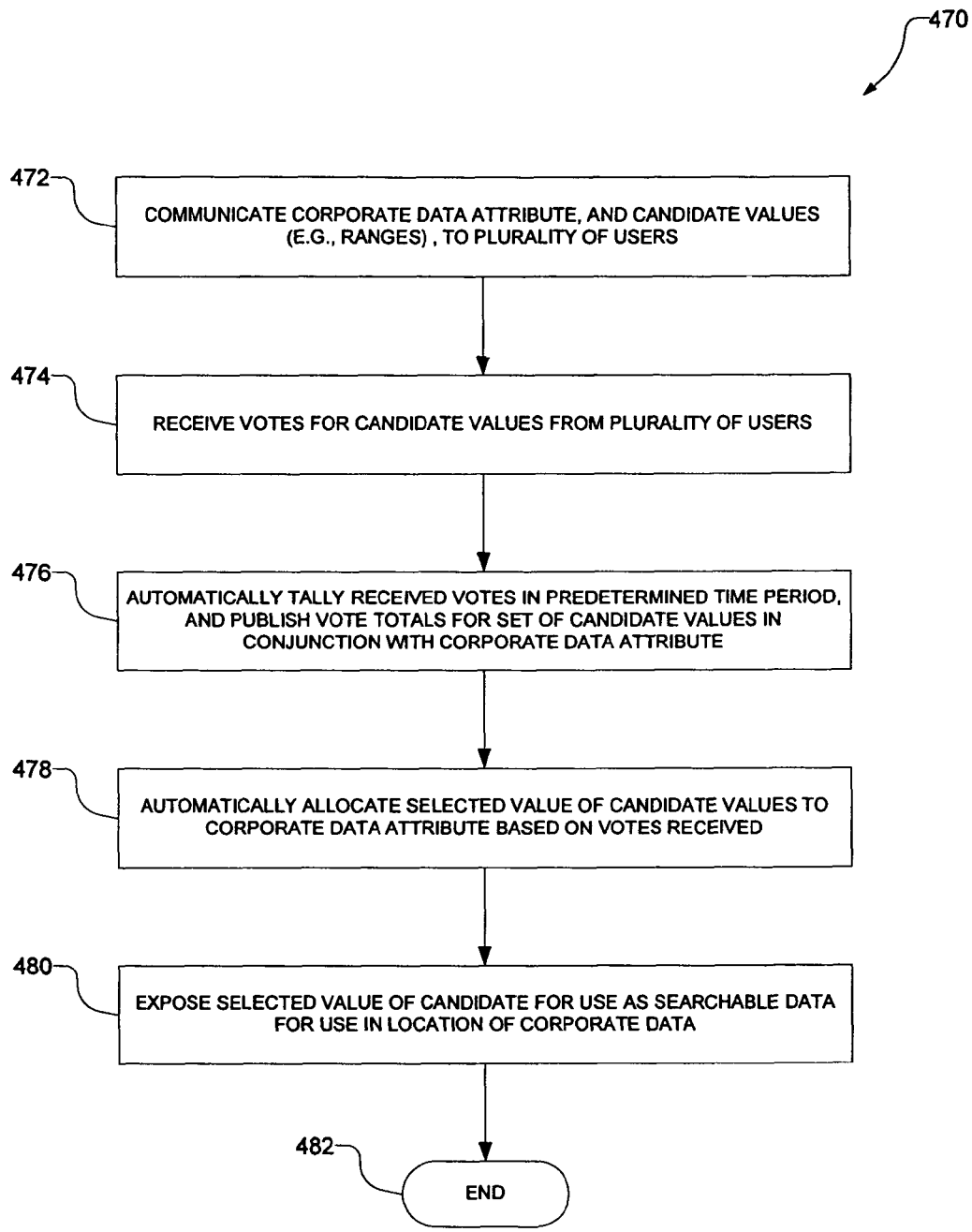
FIG. 26 is a flowchart illustrating a method, according to an example embodiment, to generate data pertaining to a corporate entity.

FIG. 26 is a flowchart illustrating a method 470, according to an example embodiment, to generate data pertaining to a corporate entity.

The method 470 commences at block 472 with the communication of at least one corporate data attribute, and a set of candidate values for the corporate data attribute, to a number of users of the contact information system 12. The candidate values may be communicated as a set of ranges, or as fixed values. The corporate data attribute, and candidate values, may be communicated by the web server modules 50, based on messaging received from the voting module 76.

Figure 27:
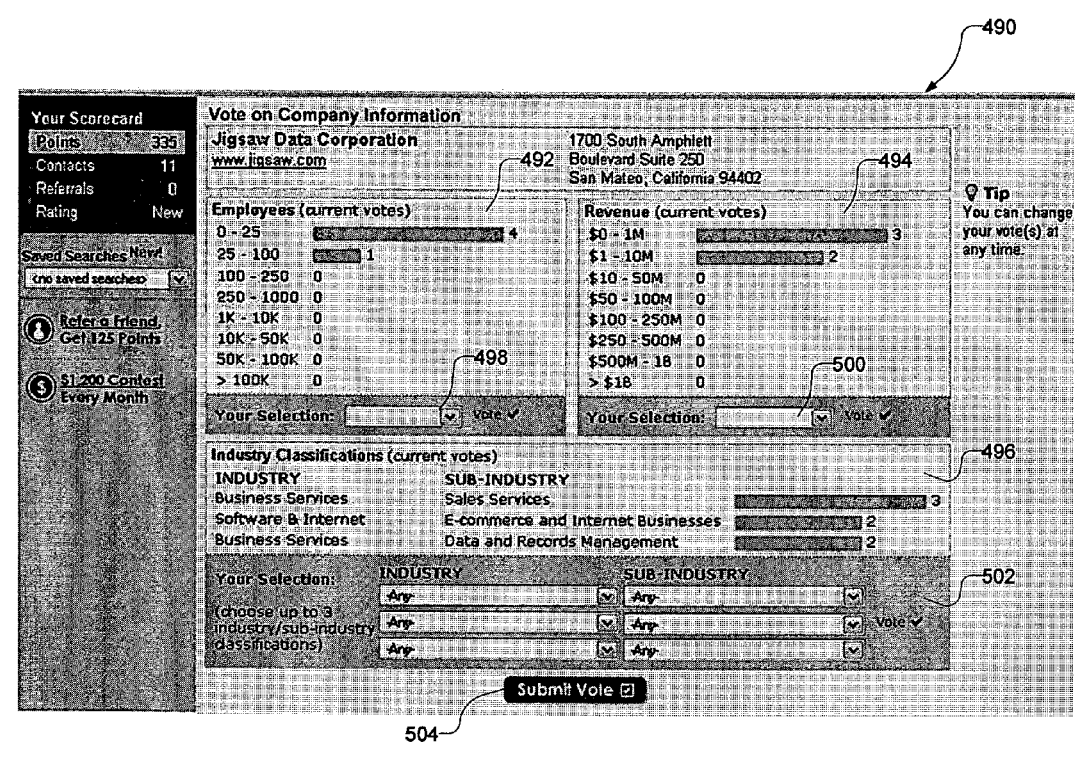

FIG. 27 is a user interface diagram illustrating an exemplary vote interface 490 which may, in an example embodiment be communicated at block 472. The vote interface 490 is shown to display three example corporate data attributes, namely an employee count attribute, a revenue attribute, and an industry classification attribute. Each of these attributes, and associated candidate values, are displayed in respective sections 492, 494 and 496 of the interface 490. Specifically, the employee section 492 provides a set of employee count ranges, and provides a drop down menu 498, from which a user can select one of the ranges displayed in the section 492. Similarly, the revenue section 494 displays a set of revenue ranges, which are user selectable by a drop down menu 500, thereby to enable a user to vote for one of the ranges.

The industry classification section 496 provides a collection of drop down menus 502, using which a user can vote for a particular industry and sub-industry, according to which the user believes the relevant corporate entity should be classified. Having provided votes for various candidate values for one or more corporate data attributes utilizing the interface 490, the user may select a "submit vote" button 504 to communicate his or her votes back to the contact information system 12.

Returning to the method 470 depicted in FIG. 26, at block 474, the contact information system 12 receives the votes for the candidate values, for each of the relevant corporate data attributes, from multiple users. The communication of the corporate data attribute, and candidate values, and the receiving of the votes at blocks 472 and 474 are performed via one or more interfaces of the contact information system, such as a web interface supported by the web servers 24.

At block 476, the voting module 76 automatically tallies votes received from users of the contact information system 12 in a predetermined time period. For example, at any time, the tallied votes may constitute votes received within the past 90 days. By limiting votes that are tallied at block 476 to votes received in the predetermined time period, the currency of the vote tallies can be optimized.

Further, at block 476, the voting module 76 proceeds to publish vote totals for each set of candidate values, in conjunction with the corporate data attributes. Referring again to the vote interface 490 shown in FIG. 27, it will be noted that the number of votes received historically in connection with each candidate value (e.g., a range of values) for each of the corporate data attributes is reflected by horizontal bar graphs shown in the respective sections 492, 494 and 496 of the interface 490.

At block 478, the voting module 76 may then also operate to allocate a selected value of the candidate values to the corporate data attribute, based on the votes received. For example, with respect to the employee count corporate data attribute shown in FIG. 27, four votes have been received for the 0-25 range, whereas only one vote has been received for the 25-100 range of employee count. Accordingly, the voting module 76 may, for purposes to be discussed below, allocate the 0-25 range to the employees count attribute.

At block 480, the voting module 76 may then expose the candidate value, selected at block 478, as searchable data in connection with the corporate attribute, for use in the location of corporate data by users of the contact information system 12. Again, for example considering the employees attribute, a search query to locate corporate entities with employees in the 0-25 range would locate the corporate entity represented in interface 490, on a count of the 0-25 range having been allocated as a selected candidate value to the employee data attribute for the relevant corporate entity.

The method 470 then ends at block 482. The above described method 470 advantageous in that it allows users of the contact information system 12, who may have some knowledge regarding a particular corporate entity, to vote with respect to values that should be assigned to corporate data attributes, thus enhancing the ability of all users of the contact information system 12 to either positively locate or filter out corporate entities based on corporate data attributes that, except for the voting of users, would have unknown values. Thus, the voting methodology described above with reference to method 470 may be viewed as a method of capturing data pertaining to a corporate entity the data capture being performed in a democratic manner based on votes received from users who may have some knowledge regarding the relevant corporate entity.

Figure 28:
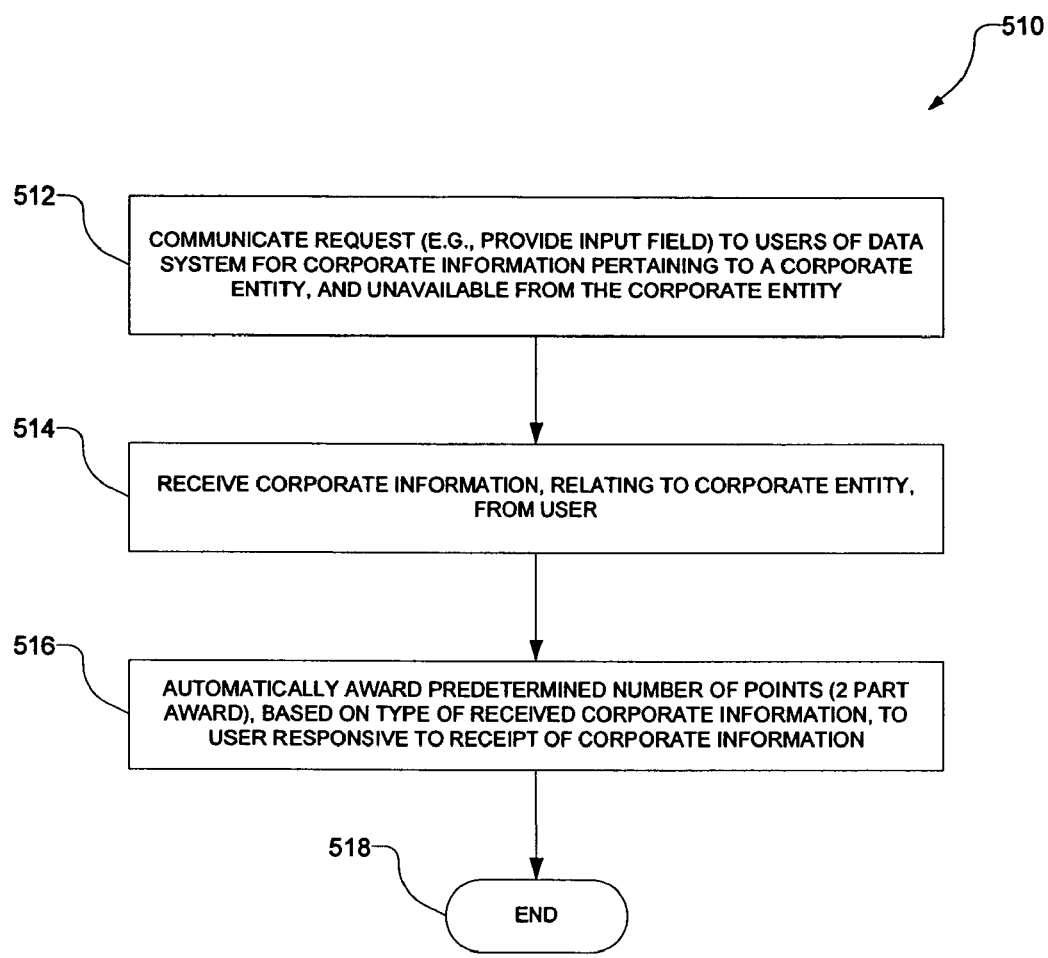
FIG. 28 is a flowchart illustrating a method, according to an example embodiment, to harvest corporate data pertaining to a corporate entity.

FIG. 28 is a flowchart illustrating a method 510, according to an example embodiment, to harvest corporate data pertaining to a corporate entity. The method 510 commences at block 512 with the communication of a request (e.g., web form processing modules 54 generate an interface including input fields) to users of the contact information system 12, the communicated request being for corporate information pertaining to an identified corporate entity. The requested information, in one embodiment, may be unavailable from the corporate entity itself or from other readily available resources.

One example of such a request may be for information regarding a member of a corporate entity that is most responsive to sales requests of a particular type, or a request for information regarding the reporting hierarchy within the corporate entity. Further, where the relevant corporate entity is a private company, the communicated request may be for any information that may not be publicly available pertaining to the private corporation. Other examples of unavailable corporate information may include financial information pertaining to the corporate entity, a number of corporate employees of the corporate entity, employee organizational information for the corporate entity, and recommended contact information for the corporate entity. The recommended contact information for the corporate entity may be in connection with the provision of goods or services to the entity.

At block 514, the contact information system 12 receives corporate information, relating to a corporate entity for one or more users. Again, the communication of the request, and the receipt of the corporate information at blocks 512 and 514 may be performed via an appropriate interface (e.g., a web interface) of the contact information system 12.

At block 516, the stored value module 66 operates to automatically provide a reward to the user, responsive to receipt of the corporate information at block 514. In one embodiment, the provided reward may constitute points that are, as described above, exchangeable within the contact information system 12 for other contact information, or that may be sold via the system 12 for monetary value.

In one embodiment, the reward provided at block 516 may constitute a two-part reward, namely an initial reward and a bonus reward that is provided if the corporate information received at block 514 is validated in some way. For example, the stored value module 66 may operate to immediately award an initial number of points (e.g., five) responsive to receipt of the value, and award a second portion (e.g., a further five points) subsequent to a verification event with respect to the received corporate information. The verification event may, for example, be the absence of a challenge or update to the corporate information within a predetermined time period, or the confirmation of the received corporate information by one or more further users of the system 12.

In yet a further embodiment, the stored value module 66 may also operate to determine the type of corporate information received at block 514, and automatically determine the value of a reward based on the determined information type. Certain types of information may be regarded by users of the contact information system 12 as being more valuable. For example, 10 points may be awarded for the provision of corporate information pertaining to the revenue of a corporate entity, whereas only 5 points may be awarded by the stored value module 66 for information indicating a number of employees of the same corporate entity.

Figure 29:
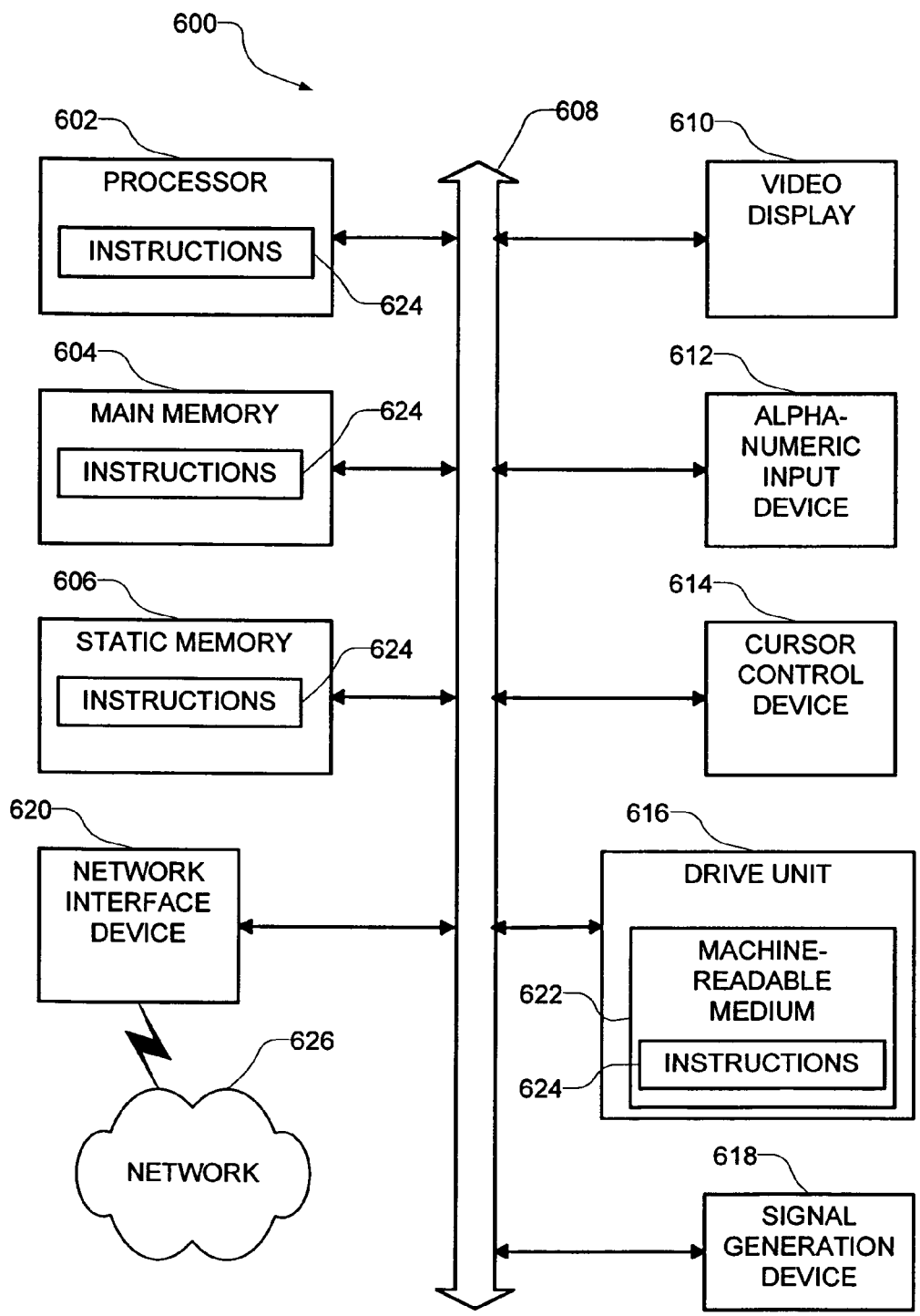
FIG. 29 shows a diagrammatic representation of machine in the example form of a computer system within which a set of instructions, for causing the machine to perform any one or more of the methodologies discussed herein, may be executed.

FIG. 29 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   a network interface;
   one or more processors; and
   a machine-readable medium storing a set of instructions that, when executed by the one or more processors, cause the machine to perform operations comprising:
   receiving contact information of an entity wherein the contact information was received from a first user of a plurality of users of the system;
   publishing the contact information to the plurality of users;
   providing a first reward to the first user of the plurality of users;
   receiving, from a second user of the plurality of users, validity information relating to the contact information;
   determining, by the one or more processors, an information type of the validity information, the information type consisting of at least one of:
   challenging validity of the contact information;
   updating the contact information; or
   confirming the validity of the contact information;
   determining, by the one or more processors, a second reward of a predetermined value based on the validity information;

providing the second reward to the second user in response to the receiving of the validity information relating to the contact information;

modifying a total stored value for the second user with the value of the second reward; and taking an action, by the one or more processors, on the total stored value, wherein the action comprises redeeming, selling, purchasing, transferring, or exchanging at least a portion of the total stored value.

2. The system of claim 1, wherein the one or more processors are further configured to:

automatically determine the information type of the validity information; and automatically determine a value of the second reward based on the determined information type.

3. The system of claim 1, wherein the one or more processors are further configured to:

immediately award a first portion of the second reward, and award a second portion of the second reward subsequent to a first predetermined time period.

4. The system of claim 1, wherein the one or more processors are further configured to:

provide a notification of receipt of the validity information to the first user, and solicit a response to the notification from the first user.

5. The system of claim 4, wherein the one or more processors are further configured to only provide the notification to the first user when the validity information is received within a second predetermined time period since receipt of the contact information from the first user.

6. The system of claim 4, wherein the validity information is a validity challenge to the contact information received from the first user, and the one or more processors are further configured to withdraw publication of the contact information upon expiration of a third predetermined time period when the first user does not provide a contesting response to the challenge.

7. The system of claim 1, wherein the one or more processors are further configured to subject the second user to a penalty when the validity information received from the second user is determined to be incorrect.

8. The system of claim 1, wherein the one or more processors are further configured to subject the first user to a penalty when the validity information received from the second user is determined to be correct.

9. A method to maintain contact information published by a contact information computer system associated with a plurality of users, the method comprising:

receiving contact information of a first entity of a plurality of entities, wherein the contact information was received from a first user of the plurality of users;

publishing, by a processor, the contact information to the plurality of users;

providing, by the processor, a first reward to the first user of the plurality of users;

receiving, from a second user of the plurality of users, validity information relating to the contact information;

determining, by the processor, an information type of the validity information, the information type consisting of at least one of:

challenging validity of the contact information, updating the contact information, or confirming the validity of the contact information;

determining, by the processor, a second reward of a predetermined value based on the validity information;

providing a second reward, by the processor, to the second user in response to the receiving of the validity information relating to the contact information;

modifying, by the processor, a total stored value for the second user with the value of the second reward; and taking an action, by the processor, on the total stored value, wherein the action comprises redeeming, selling, purchasing, transferring, or exchanging at least a portion of the total stored value.

10. The computer-implemented method of claim 9, further comprising:

determining the information type of the validity information; and automatically determining a value of the second reward based on the determined information type.

11. The computer-implemented method of claim 9, wherein the automatic provision of the second reward to the second user comprises:

immediately awarding a first portion of the second reward; and awarding a second portion of the second reward subsequent to a first predetermined time period.

12. The computer-implemented method of claim 9, further comprising:

providing a notification of receipt of the validity information to the first user, and soliciting a response to the notification from the first user.

13. The computer-implemented method of claim 12, further comprising only providing the notification to the first user based on the validity information being received within a second predetermined time period since receipt of the contact information from the first user.

14. The computer-implemented method of claim 12, wherein the validity information is a validity challenge to the contact information received from the first user, the computer-implemented method further comprising withdrawing publication of the contact information after a third predetermined time period when the first user does not provide a contesting response to the challenge.

15. The computer-implemented method of claim claim 9, further comprising subjecting the second user to a penalty when the validity information received from the second user is determined to be incorrect.

16. The computer-implemented method of claim claim 9, further comprising subjecting the first user to a penalty when the validity information received from the second user is determined to be correct.

17. A non-transitory machine readable medium storing a set of instructions that, when executed by one or more processors of a machine, cause the machine to perform operations comprising:

receiving contact information of a first entity at the system, wherein the contact information was received from a first user of a plurality of users of a contact information computer system;

publishing, via a communications network, the contact information to the plurality of users;

providing, by the one or more processors, a first reward to the first user of the plurality of users;

receiving, from a second user of the plurality of users, validity information relating to the contact information;

determining, by the one or more processors, an information type of the validity information, the information type consisting of at least one of:

challenging validity of the contact information, updating the contact information, or confirming the validity of the contact information;

determining, by the one or more processors, the amount of the second reward according to a predetermined value based on the validity information;

providing a second reward to the second user in response to the receiving of the validity information relating of the contact information;

modifying, by the one or more processors, a total stored value for the second user with the value of the second reward; and taking an action, by the one or more processors, on the total stored value, wherein the action comprises redeeming, selling, purchasing, transferring, or exchanging at least a portion of the total stored value.

18. The computer-implemented method of claim 12, further comprising:

receiving, from the first user, a response to the notification of receipt of the validity information, wherein the response from the first user concedes the validity information to be correct; and validating the validity information received from the second user.

19. The computer-implemented method of claim 12, further comprising:

receiving, from the first user, a response to the notification of receipt of the validity information, wherein the response from the first user does not concede the validity information to be correct;

transmitting information to notify the second user that the first user does not concede the validity information to be correct; and soliciting a response from the second user.

20. The computer-implemented method of claim 19, further comprising:

receiving, from the second user, a response that the second user concedes the validity information to be incorrect; and subjecting the second user to a penalty.

21. The computer-implemented method of claim 19, further comprising:

receiving, from the second user, a response that the second user does not concede the validity information to be incorrect; and subjecting the validity information received from the second user to at least one of an appeal or an arbitration process when there is a disagreement between the first and second users regarding accuracy of the validity information received from the second user.

22. The system of claim 1, wherein the one or more processors are further configured to:

receive, from the first user, a response to the notification of receipt of the validity information, wherein the response from the first user concedes the validity information to be correct; and validate the validity information received from the second user.

23. The system of claim 1, wherein the one or more processors are further configured to:

receive, from the first user, a response to the notification of receipt of the validity information, wherein the response from the first user does not concede the validity information to be correct;

transmit information to notify the second user that the first user does not concede the validity information to be correct; and solicit a response from the second user.

24. The system of claim 23, wherein the one or more processors are further configured to:

receive, from the second user, a response that the second user concedes the validity information to be incorrect; and subject the second user to a penalty.

25. The system of claim 23, wherein the one or more processors are further configured to:

receive, from the second user, a response that the second user does not concede the validity information to be incorrect; and subject the validity information received from the second user to at least one of an appeal or an arbitration process when there is a disagreement between the first and second users regarding accuracy of the validity information received from the second user.

\* \* \* \* \*